United States Patent
Sakurai et al.

(10) Patent No.: US 7,535,539 B2
(45) Date of Patent: May 19, 2009

(54) IMAGE DISPLAY DEVICE, METHOD OF MANUFACTURING IMAGE DISPLAY PANEL AND IMAGE DISPLAY PANEL

(75) Inventors: Ryou Sakurai, Kokubunji (JP); Hidetoshi Hiraoka, Nishitokyo (JP); Taichi Kobayashi, Kodaira (JP); Takanori Shoji, Higashimurayama (JP); Hajime Tamura, Kawasaki (JP); Shinichi Kita, Saitama Pref. (JP)

(73) Assignee: Bridgestone Corporation, Tokyo (JP)

( * ) Notice: Subject to any disclaimer, the term of this patent is extended or adjusted under 35 U.S.C. 154(b) by 494 days.

(21) Appl. No.: 10/567,455

(22) Filed: Feb. 7, 2006

(65) Prior Publication Data

US 2007/0097336 A1    May 3, 2007

(30) Foreign Application Priority Data

| Aug. 7, 2003 | (JP) | ............................. 2003-288811 |
| Sep. 12, 2003 | (JP) | ............................. 2003-321256 |
| Dec. 3, 2003 | (JP) | ............................. 2003-404453 |
| Jan. 28, 2004 | (JP) | ............................. 2004-019811 |
| Apr. 12, 2004 | (JP) | ............................. 2004-116444 |
| Apr. 20, 2004 | (JP) | ............................. 2004-124343 |

(51) Int. Cl.
*G02F 1/1339* (2006.01)
*G02F 1/13* (2006.01)

(52) U.S. Cl. .......................... 349/155; 349/78; 349/106; 349/144; 349/187; 345/694; 359/296

(58) Field of Classification Search ................ 349/155, 349/56, 58, 73, 74, 78, 106, 104, 108, 123, 349/124, 144, 156, 157, 158, 166, 187, 189, 349/192; 345/694, 695, 33, 37, 38, 39, 40, 345/41, 60; 359/296, 237, 290, 294, 295

See application file for complete search history.

(56) References Cited

U.S. PATENT DOCUMENTS 5,673,092 A    9/1997    Horie et al. .................... 349/86

(Continued)

FOREIGN PATENT DOCUMENTS

EP    1 482 354 A1    12/2004    ............. 349/155 X (Continued)

OTHER PUBLICATIONS

Kieswetter, J., et al., "Aspects of proximity exposure equipment," 9th Triennial Conference of the ITG-Chapter 8.6 "Vacuum Electronics and Displays", May 2-3, 2001, Garmisch-Partenkirchen, Germany, No. 165, pp. 249-254.

(Continued)

*Primary Examiner*—Brian M Healy
(74) *Attorney, Agent, or Firm*—Sughrue Mion, PLLC

(57) ABSTRACT

An image display device which comprises an image display panel, in which particles or liquid powders as image display media are sealed in cells formed in an isolated manner from one another by partition walls between two opposed substrates, at least one of two substrates being transparent, and, in which the particles or the liquid powders, to which an electrostatic field is applied, are made to move so as to display an image, is characterized in that: (1) the partition walls are manufactured by a photolithography method, and a shape of the partition wall is a taper shape such that a width of an end portion at a side of a rear substrate is larger than that at a side of a front substrate; (3-1) a plurality of cells are arranged in such a manner that they do not correspond one for one to the positions of pixels for displaying the image; (3-2) a ratio of cell area/pixel area is formed to be smaller than 4; and (2) the image display panel is manufactured by: forming a first layer made of photosensitive color composite on one substrate; forming a second layer made of photosensitive composite, which has a light transmission higher than that of the first layer and a thickness larger than that of the first layer, on the first layer; performing an exposure through a mask with respect to the first layer and the second layer on the substrate; performing a developing and a washing with respect to the exposed first and second layers so as to form color partition walls on the substrate; and connecting the other substrate to the color partition walls.

22 Claims, 19 Drawing Sheets

U.S. PATENT DOCUMENTS

| | | | |
|---|---|---|---|
| 6,172,798 B1 | 1/2001 | Albert et al. | 359/296 |
| 6,266,121 B1 | 7/2001 | Shigeta et al. | 349/156 |
| 6,862,016 B2 * | 3/2005 | Matsuura et al. | 345/107 |
| 7,307,646 B2 * | 12/2007 | Brown Elliott | 345/694 |
| 7,342,556 B2 * | 3/2008 | Oue et al. | 345/33 |
| 2002/0008898 A1 | 1/2002 | Katase | 359/296 |
| 2002/0067333 A1 | 6/2002 | Uno et al. | 345/107 |
| 2008/0174854 A1 * | 7/2008 | Sakurai et al. | 359/296 |

FOREIGN PATENT DOCUMENTS

| | | | |
|---|---|---|---|
| JP | 2-284128 A | 11/1990 | |
| JP | 2002-19636 A | 7/2002 | 349/155 X |
| JP | 2002-196376 A | 7/2002 | |
| JP | 2002-229074 A | 8/2002 | |
| JP | 2003-186425 A | 7/2003 | |
| JP | 2003-202600 A | 7/2003 | |
| JP | 2003-208107 A | 7/2003 | |
| JP | 2004-101890 A | 4/2004 | |
| JP | 2004-272199 A | 9/2004 | |
| JP | 2004-286861 A | 10/2004 | |
| JP | 2004-333893 A | 11/2004 | |
| JP | 2004-347810 A | 12/2004 | |
| WO | 03/027764 A1 | 4/2003 | 349/155 X |

OTHER PUBLICATIONS

Supplemental European Search Report dated Jun. 22, 2007.

* cited by examiner

FIG. 10
(a)
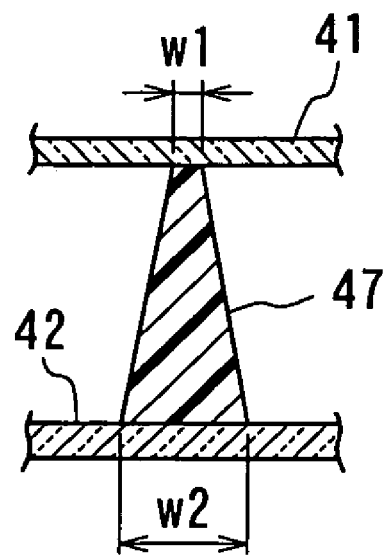
(b)
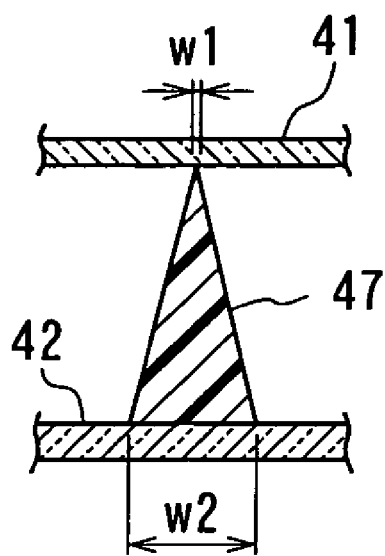

IMAGE DISPLAY DEVICE, METHOD OF MANUFACTURING IMAGE DISPLAY PANEL AND IMAGE DISPLAY PANEL

TECHNICAL FIELD

The present invention relates to an image display device having an image display panel, a method of manufacturing an image display panel and an image display panel, in which an image can be displayed or deleted repeatedly by moving an image display media such as particles or liquid powders by means of electrostatics.

BACKGROUND ART

As an image display device substitutable for liquid crystal display (LCD), image display devices with the use of technology such as an electrophoresis method, an electro-chromic method, a thermal method, dichroic-particles-rotary method are proposed.

As for these image display devices, it is conceivable as inexpensive visual display device of the next generation from a merit having wide field of vision close to normal printed matter, having smaller consumption with LCD, or having a memory function, and spreading out to a display for portable device and an electronic paper is expected. Recently, electrophoresis method is proposed that microencapsulate dispersion liquid made up with dispersion particles and coloration solution and dispose the liquid between faced substrates.

However, in the electrophoresis method, there is a problem that a response rate is slow by the reason of viscosity resistance because the particles migrate among the electrophoresis solution. Further, there is a problem of lacking imaging repetition stability, because particles with high specific gravity of titanium oxide is scattered within solution of low specific gravity, it is easy to subside, difficult to maintain a stability of dispersion state. Even in the case of microencapsulating, cell size is diminished to a microcapsule level in order to make it hard to appear, however, an essential problem was not overcome at all.

Besides the electrophoresis method using behavior in the solution, recently, a method wherein electro-conductive particles and a charge transport layer are installed in a part of the substrate without using solution is proposed. [The Imaging Society of Japan "Japan Hardcopy '99" (Jul. 21-23, 1999) Transaction Pages 249-252] However, the structure becomes complicated because the charge transport layer and further a charge generation layer are to be arranged. In addition, it is difficult to constantly dissipate charges from the electro-conductive particles, and thus there is a drawback on the lack of stability.

As one method for overcoming the various problems mentioned above, an image display device comprising an image display panel is known, in which image display media are sealed in cells formed in an isolated manner from one another by partition walls between a front substrate and a rear substrate, at least one of two substrates being transparent, and, in which the image display media, to which an electrostatic field is applied, are made to move so as to display an image by means of Coulomb's force and so on.

Further, in the image display panel installed in the known image display device mentioned above, a plurality of cells formed by the partition walls correspond normally one for one to the positions of pixels for displaying the image. However, in the case that the cells correspond one for one to the pixel positions, if use is made of the substrates having bad dimension accuracy (which is especially found in resin substrate), there is a drawback such that the cells and the pixel positions become out of alignment when upper and lower substrates are laminated. Moreover, in the case of aiming for a high definition image display panel, a rate of partition wall cross section occupied on a display surface of the panel becomes higher, and thus there is a drawback such that an opening rate is lowered. Further, if the cell is larger than the pixel, there occurs a movement of the image display media in the cell, and thus there is a drawback such that a display quality if lowered. (Tasks of the first invention)

Moreover, among the techniques mentioned above, in the case of making a color of the overall partition wall equal to a color of one of the image display media, especially in the case of making the overall partition wall to a deep color such as black, if a pigment or a dye having deep color such as black is blended in a resist, there is a drawback such that a light transmission of the resist used for forming the partition wall becomes worse. If a light transmission of the resin becomes worse in this manner, when a light exposure is performed through a mask for a portion to be hardened so as to form the partition wall, a light is not evenly exposed to such portion. Especially, in the case of forming the partition wall having a large height, there is a drawback such that a possibility of generating a developing defect, in which the partition walls are not formed according to a predetermined pattern, becomes higher. (Tasks of the second invention)

The image display device having the construction mentioned above is promising since it is a dry type and has a rapid response speed and a simple construction. In addition, there are high requirements such that: a manufacturing is simple; a connection reliability between the substrate and the partition wall is made higher; and a high opening rate is achieved by making a display area larger. (Tasks of the third invention)

DISCLOSURE OF INVENTION

An object of the first invention is to eliminate the drawbacks mentioned above and to provide an image display device having an image display panel, which can achieve a high definition by making an opening rate higher.

Moreover, another object of the first invention is to eliminate the drawbacks mentioned above and to provide an image display device having an image display panel, which has an excellent display quality.

According to a first aspect of the first invention, an image display device which comprises an image display panel, in which image display media are sealed in cells formed in an isolated manner from one another by partition walls between the opposed substrates, at least one of two substrates being transparent, and, in which the image display media, to which an electrostatic field is applied, are made to move so as to display an image, is characterized in that a plurality of cells are arranged in such a manner that they do not correspond one for one to the positions of pixels for displaying the image.

According to a second aspect of the first invention, an image display device which comprises an image display panel, in which image display media are sealed in cells formed in an isolated manner from one another by partition walls between the opposed substrates, at least one of two substrates being transparent, and, in which the image display media, to which an electrostatic field is applied, are made to move so as to display an image, is characterized in that a ratio of cell area/pixel area is formed to be smaller than 4.

Moreover, in preferred embodiments of the image display device according to the first invention, there are cases such that: a shape of the cell formed by the partition walls is a square shape, a triangular shape, a hexagonal shape, a circular shape or an oval shape; an arrangement of the cell is a honeycomb structure or a grid structure; a shape of the cell formed by the partition walls is a hexagonal shape and an arrangement of the cell is a honeycomb structure; and the image display media are particles or liquid powders.

In the image display device according to the first aspect of the first invention, since a plurality of cells are arranged in such a manner that they do not correspond one for one to the positions of pixels for displaying the image, a displacement between the cell and the pixel position is not worried even when laminating upper and lower substrates. In addition, since a rate of the partition wall cross section occupied on a display surface of the image display panel can be lowered, it is possible to achieve a high definition by making the opening rate higher.

Moreover, in the image display device according to the second aspect of the first invention, since a ratio of cell area/pixel area is formed to be smaller than 4, it is possible to improve a display quality.

An object of the second invention is to eliminate the drawbacks mentioned above and to provide a method of manufacturing an image display panel and an image display panel, which can further form the partition walls according to a predetermined pattern without generating a developing defect, in addition to the image display panel which has a simple construction, an inexpensive cost and an excellent stability.

According to a second invention, a method of manufacturing an image display panel having such a construction that image display media such as gas, liquid, solid, particles, liquid powders and so on are sealed in cells formed in an isolated manner from one another by partition walls between two opposed substrates, at least one of two substrates being transparent, is characterized in that the improvement comprises the steps of: forming a first layer made of photosensitive color composite on one substrate; forming a second layer made of photosensitive composite, which has a light transmission higher than that of the first layer and a thickness larger than that of the first layer, on the first layer; performing an exposure through a mask with respect to the first layer and the second layer on the substrate; performing a developing and a washing with respect to the exposed first and second layers so as to form color partition walls on the substrate; and connecting the other substrate to the color partition walls.

Moreover, in preferred embodiments of the method of manufacturing the image display panel according to the second invention, there are cases such that: a light transmission of the photosensitive color composite forming the first layer in a wavelength band of visible light (380 nm-780 nm) is not larger than 20%, and a light transmission of the photosensitive composite forming the second layer in a wavelength band of 300 nm-450 nm is not less than 20%; a film made of a photosensitive composite is laminated on the first layer so as to obtain the second layer; and a color of the first layer is black.

Further, according to the second invention, an image display panel is characterized in that the improvement is manufactured according to the method of manufacturing the image display panel mentioned above. Especially, the improvement uses particles or liquid powders as the image display media.

In the method of manufacturing the image display panel according to the second invention, since the improvement comprises the steps of: forming a first layer made of photosensitive color composite on one substrate; forming a second layer made of photosensitive composite, which has a light transmission higher than that of the first layer and a thickness larger than that of the first layer, on the first layer; performing an exposure through a mask with respect to the first layer and the second layer on the substrate; and performing a developing and a washing with respect to the exposed first and second layers so as to form color partition walls on the substrate, the second layer having a high light transmission, which is arranged near a light source during an exposure, can be formed according to the predetermined pattern. In addition, since the first layer having a low light transmission, which is arranged under the second layer, is a thin layer, it is possible to perform an excellent patterning as is mentioned above. As a result, it is possible to form the partition walls according to the predetermined pattern without generating a developing defect.

An object of the third invention is to eliminate the drawbacks mentioned above and to provide an image display device, which can further achieve a high opening rate and a high connection reliability between the substrate and the partition wall, in addition to the image display device which has a simple construction, an inexpensive cost and an excellent stability.

According to the third invention, an image display device which comprises an image display panel, in which particles or liquid powders as image display media are sealed in cells formed in an isolated manner from one another by partition walls between two opposed substrates, at least one of two substrates being transparent, and, in which the particles or the liquid powders, to which an electrostatic field is applied, are made to move so as to display an image, is characterized in that the partition walls are manufactured by a photolithography method, and a shape of the partition wall is a taper shape such that a width of an end portion at a side of a rear substrate is larger than that at a side of a front substrate.

Moreover, in a preferred embodiment of the image display device according to the third invention, there is a case such that the partition walls are manufactured by means of the photolithography method by: applying a photosensitive material including a thermo-setting resin on the substrate; performing an exposure only for a portion of the applied photosensitive material corresponding to the partition walls by using a photo mask; hardening the photosensitive material; and removing non-hardening portions by developing; so that the partition walls having a reverse taper shape, such that the width of the end portion at a side of the rear substrate is larger than that at a side of the front substrate, are formed.

Further, in preferred embodiments of the image display device according to the third invention, there are cases such that:, in the case of manufacturing the partition wall having the reverse taper shape, a light is intentionally diffused by performing a proximity exposure, in which a gap is formed between the photo mask and the photosensitive material, so that the reverse taper shape is formed;, in the case of manufacturing the partition wall having the reverse taper shape, an exposure is performed at a low amount of light exposure so as to react only a surface layer of the hardening agent, so that the reverse taper shape is formed; a ratio w1/w2 between an end width w2 at a side of the rear substrate and an end width w1 at a side of the front substrate is not larger than 0.5; and a color of the particles or the liquid powders used for the image display media is white or black.

Furthermore, in preferred embodiments of the image display device according to the third invention, there are cases such that: the partition wall positioned between the opposed substrates has a cantilever rib structure; and a particle size distribution Span of inorganic powders included in the partition wall material, which is defined by the following formula, is less than 8: Span=(d(0.9)−d(0.1))/d(0.5); (here, d(0.5) means a value of the particle size expressed by μm wherein an amount of the particles having the particle size larger than or smaller than this value is 50%, d(0.1) means a value of the particle size expressed by μm wherein an amount of the particles having the particle size smaller than this value is 10%, and d(0.9) means a value of the particle size expressed by μm wherein an amount of the particles having the particle size smaller than this value is 90%).

In the image display device according to the third invention, since the partition walls are manufactured by means of the photo-lithography method by: applying a photosensitive material including a thermosetting resin on the substrate; performing an exposure only for a portion of the applied photosensitive material corresponding to the partition walls by using a photo mask; hardening the photosensitive material; and removing non-hardening portions by developing; so that the partition walls having a reverse taper shape are formed, it is possible to form the partition walls having a predetermined shape mentioned below in a simple method. In addition, since the partition walls have a reverse taper shape, such that the width of the end portion at a side of the rear surface is larger than that at a side of the front substrate, are formed, it is possible to make a portion of the partition wall contacted with the front substrate smaller, and thus it is possible to make a display area larger. Further, it is possible to make a portion of the partition wall contacted with the rear substrate larger, and thus it is possible to improve a connection strength between the substrate and the partition wall.

BRIEF DESCRIPTION OF DRAWINGS

FIG. 10a and 10b are longitudinal sectional views respectively showing one embodiment of a partition wall formed in an image display device according to the third invention.

DETAILED DESCRIPTION OF THE INVENTION

At first, a basic construction of an image display panel used for an image display device will be explained. In the image display panel used in the present invention, an electrostatic field is applied to image display media sealed between opposed two substrates. Charged image display media are attracted along a direction of electrostatic field to be applied by means of Coulomb's force, and thus the image display media can be moved reciprocally by varying a direction of electrostatic field due to a switching operation of potential. Accordingly, an image can be displayed. Therefore, it is necessary to design the image display panel in such a manner that the image display media can move evenly and maintain stability during a reciprocal operation or during a reserving state. Here, in the case of using particles or liquid powders as the image display media, as to forces applied to the particles, there are an attraction force between the particles due to Coulomb' force, an imaging force with respect to the electrode panel, an intermolecular force, a liquid cross-linking force and a gravity.

Hereinafter, the first invention to the third invention will be explained in detail orderly.

<First Invention>

An example of an image display panel used in an image display device according to the first invention will be explained with reference to FIG. 1-FIG. 2.

Figure 1:
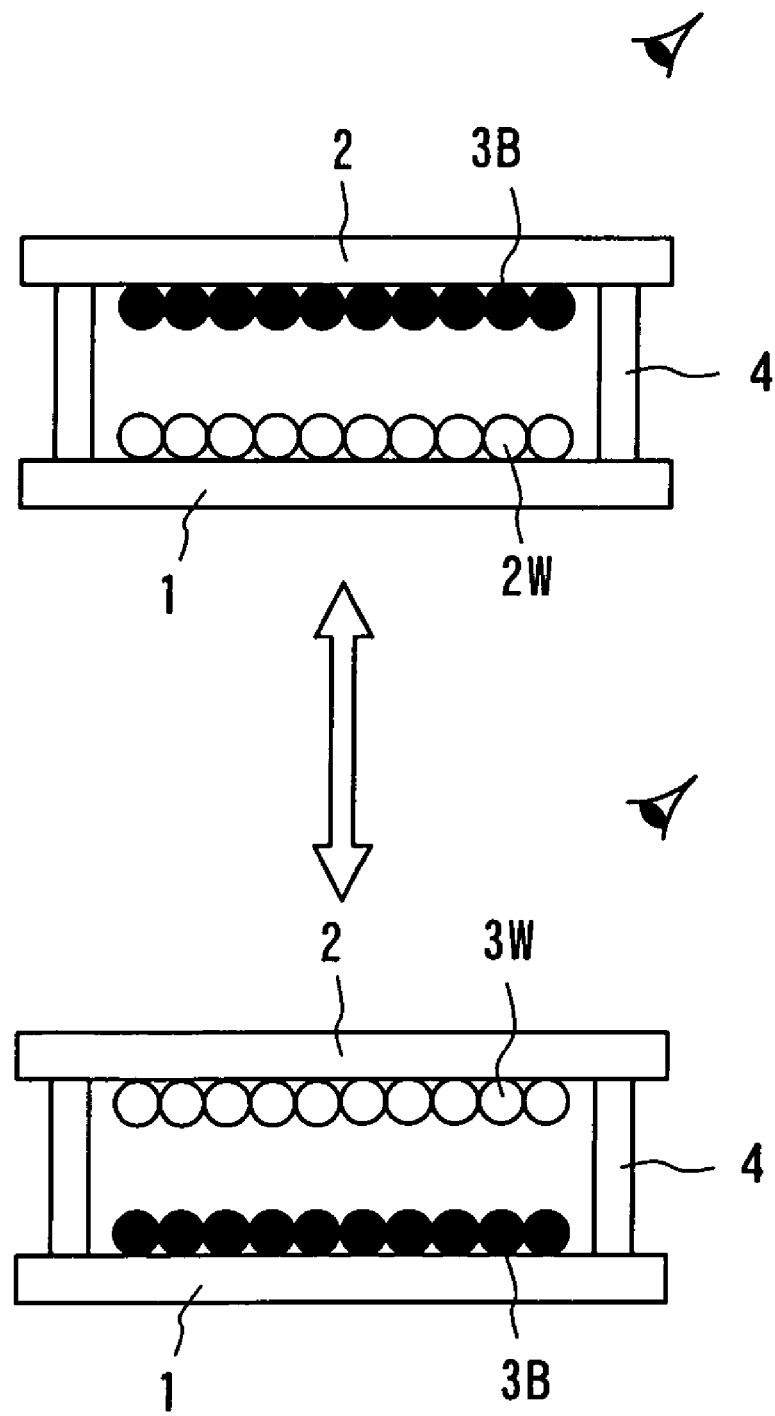
FIG. 1 is a schematic view showing one embodiment of an image display device using particles according to the first invention.

In an example shown in FIG. 1, particles 3 (here, white particles 3W and black particles 3B) as two or more groups of image display media having different colors are made to move in a vertical direction with respect to substrates 1, 2 in response to an electrostatic field applied from outside of the substrates 1, 2 so as to display a black color by viewing the black particles 3B to an observer or to display a white color by viewing the white particles 3W to an observer. In the example shown in FIG. 1, partition walls 4 are formed for example in a grid manner between the substrates 1 and 2 so as to form display cells.

Figure 2:
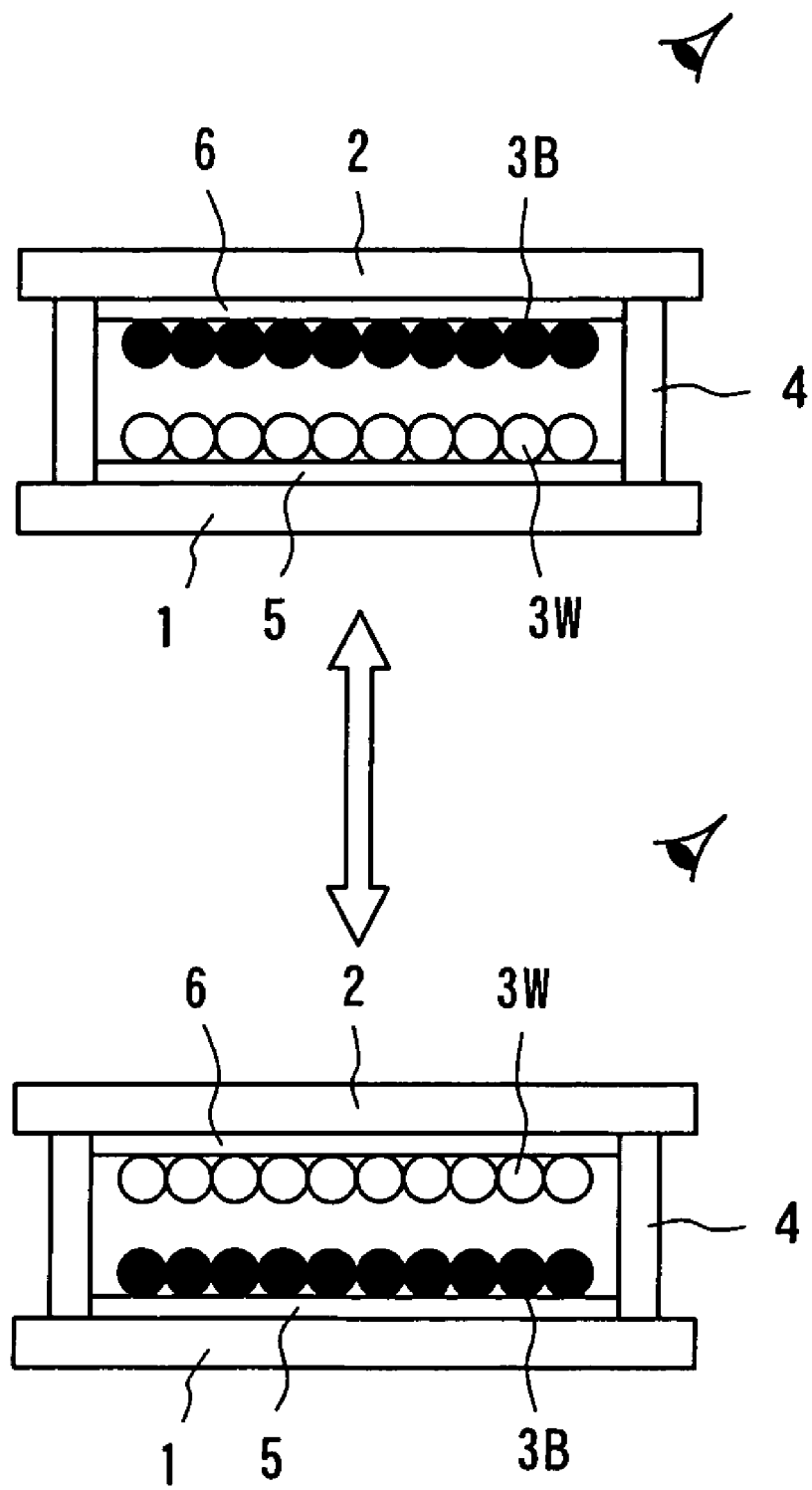
FIG. 2 is a schematic view illustrating another embodiment of an image display device using particles according to the first invention.

In an example shown in FIG. 2, particles 3 (here, white particles 3W and black particles 3B) as two or more groups of image display media having different colors are made to move in a vertical direction with respect to substrates 1, 2 in response to an electrostatic field generated by applying a voltage between an electrode 5 arranged on the substrate 1 and an electrode 6 arranged on the substrate 6 so as to display a black color by viewing the black particles 3B to an observer or to display a white color by viewing the white particles 3W to an observer. In the example shown in FIG. 2, partition walls 4 are formed for example in a grid manner between the substrates 1 and 2 so as to form display cells.

The same explanation can be applied, as it is, if the white particles 3W are substituted for white liquid powders and the black particles 3B are substituted for black liquid powders.

<First Embodiment of the First Invention>

A feature of the image display device according to the first embodiment of the first invention is that a plurality of cells 11 are arranged in such a manner that they do not correspond one for one to the positions of pixels for displaying the image. Hereinafter, this feature will be explained in further detail.

Figure 3:
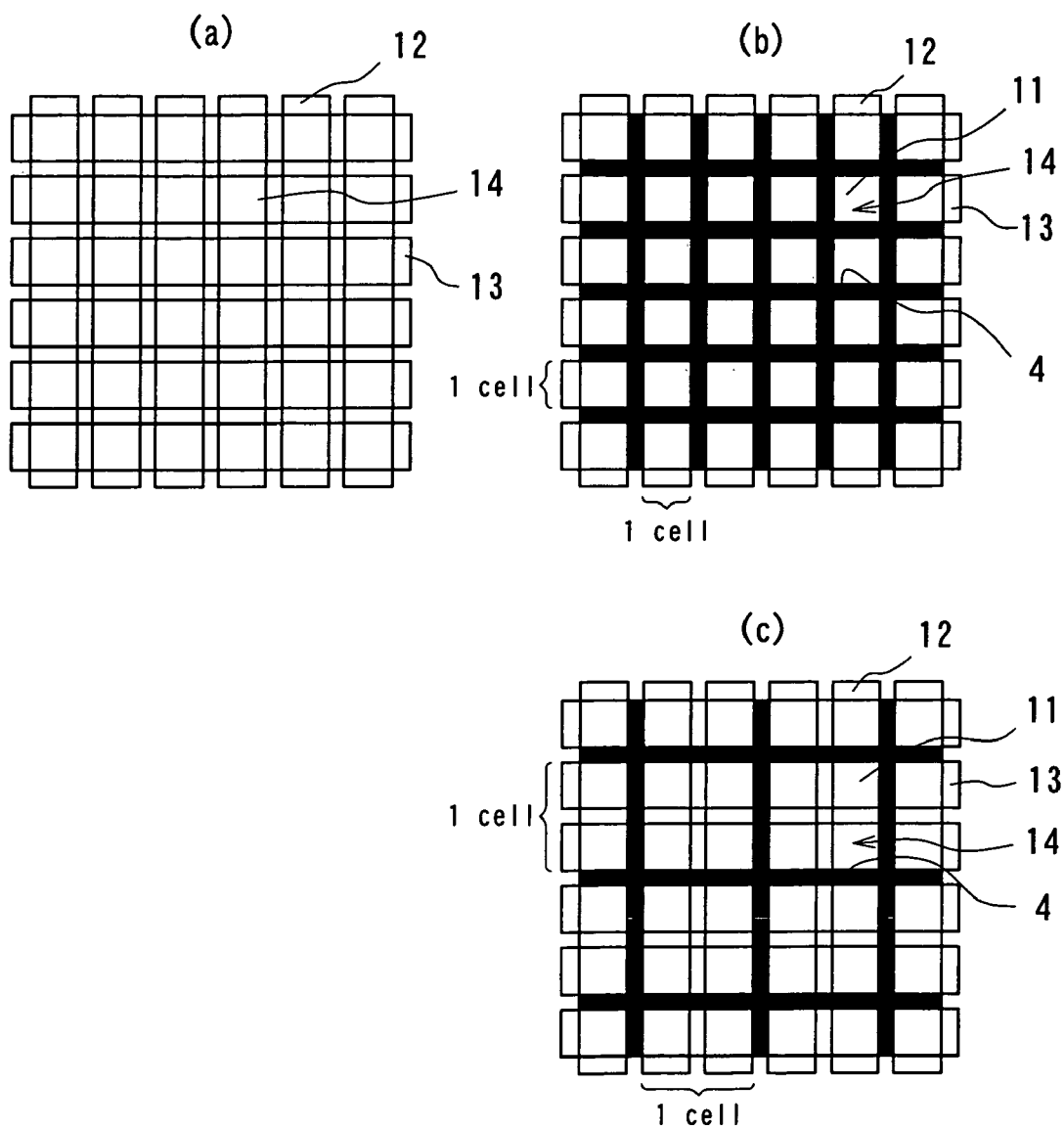
FIG. 3a-3c are schematic views respectively explaining a relation between pixel and cell in an image display device according to a first embodiment of the first invention.

FIGS. 3a-3c are schematic views respectively explaining a relation between pixel and cell in the image display device according to the first embodiment of the first invention. At first, as shown in FIG. 3a, a plurality of electrodes 12 having a stripe shape in a longitudinal direction are arranged in parallel with respect to one of the substrates 1, 2 so as to form one of the electrodes 5, 6. In addition, a plurality of electrodes 13 having a stripe shape in a lateral direction are arranged in parallel with respect to the other substrate so as to form the other electrode. In this case, one portion, at which the electrode 12 and the electrode 13 are overlapped, constructs one pixel 14.

Under the condition mentioned above, an example such that the partition walls 4 are arranged to all the portions at which the electrode 12 and the electrode 13 are not overlapped as shown in FIG. 3b, shows the case such that the cells 11 correspond one for one to the positions of pixels 14. On the other hand, an example such that the partition walls 4 are arranged alternately both in longitudinal direction and in lateral direction to the portions at which the electrode 12 and the electrode 13 are not overlapped as shown in FIG. 3c, shows the case such that four cells 11 correspond to one position of pixel 14.

In the image display device according to the invention, it is a feature that the cells 11 do not correspond one for one to the positions of pixels 14 as shown in FIG. 3a, and one example is shown in FIG. 3c in which the four cells 11 correspond to one position of pixels 14. As shown in FIG. 3c, in the case such that the cells 11 do not correspond one for one to the positions of pixels 14, it is possible to make an area occupied by the partition walls smaller, and thus it is possible to make an opening rate of the image display panel higher accordingly. A shape of the partition walls 4 is not particularly limited, but it is preferred that a shape of the cell 11 formed by the partition walls 4 is a square shape, a triangular shape, a hexagonal shape, a circular shape or an oval shape. Moreover, it is preferred that an arrangement of the cell 11 formed by the partition walls 4 is a honeycomb structure. Further, it is more preferred that a shape of the cell 11 formed by the partition walls 14 is a hexagonal shape and an arrangement of the cell 11 is a honeycomb structure.

<Second Embodiment of the First Invention>

A feature of the image display device according to the second embodiment of the first invention is that a relation between the cell 11 and the pixel is set in such a manner that a ratio of cell area/pixel area is formed to be smaller than 4, since the image display media start to move in the cells 11 during a matrix displaying if the number of the pixels consisting of one cell 11 is excessively larger.

That is, as shown in FIG. 3c, one cell 11 constructs four pixels 14 at maximum, thereby making the ratio of cell 11 area/pixel 14 area to be smaller than 4. In this manner, it is possible to display characters in such a manner that their edges look like sharp, and thus it is possible to improve a display quality. As is the same as the first embodiment, a shape of the partition walls 4 is not particularly limited, but it is preferred that a shape of the cell 11 formed by the partition walls 4 is a square shape, a triangular shape, a hexagonal shape, a circular shape or an oval shape. Moreover, it is preferred that an arrangement of the cell 11 formed by the partition walls 4 is a honeycomb structure. Further, it is more preferred that a shape of the cell 11 formed by the partition walls 14 is a hexagonal shape and an arrangement of the cell 11 is a honeycomb structure.

<Second Invention>

Then, an image display operation in the basic construction of the image display panel according to the second invention will be explained. Here, the explanation is made to the example using the particles as the image display media, but the basic construction is the same as that of the other image display media such as gas, liquid, solid, liquid powders and so on.

Figure 4:
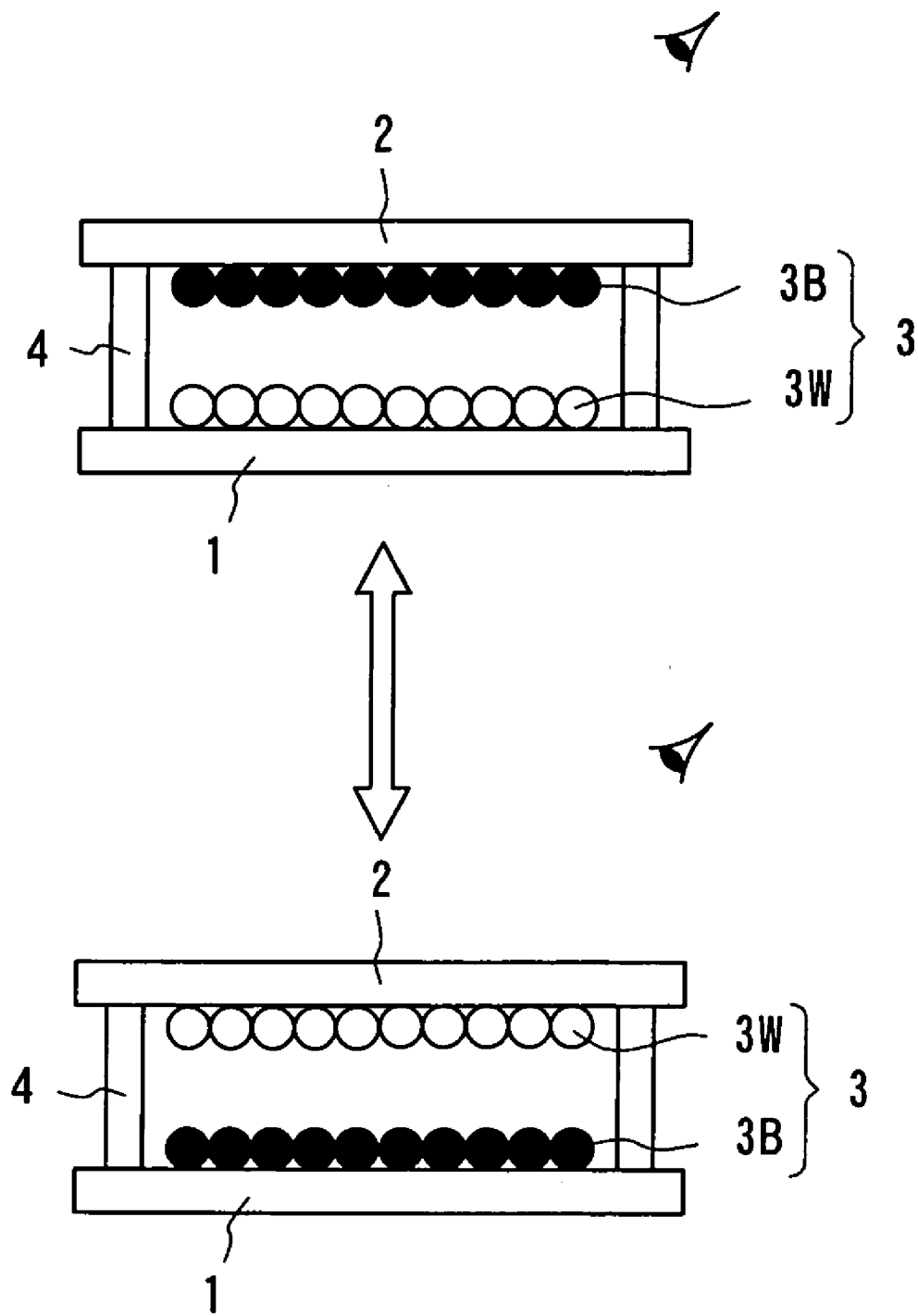
FIG. 4 is a schematic view depicting one embodiment of an image display panel according to the second invention.
Figure 5:
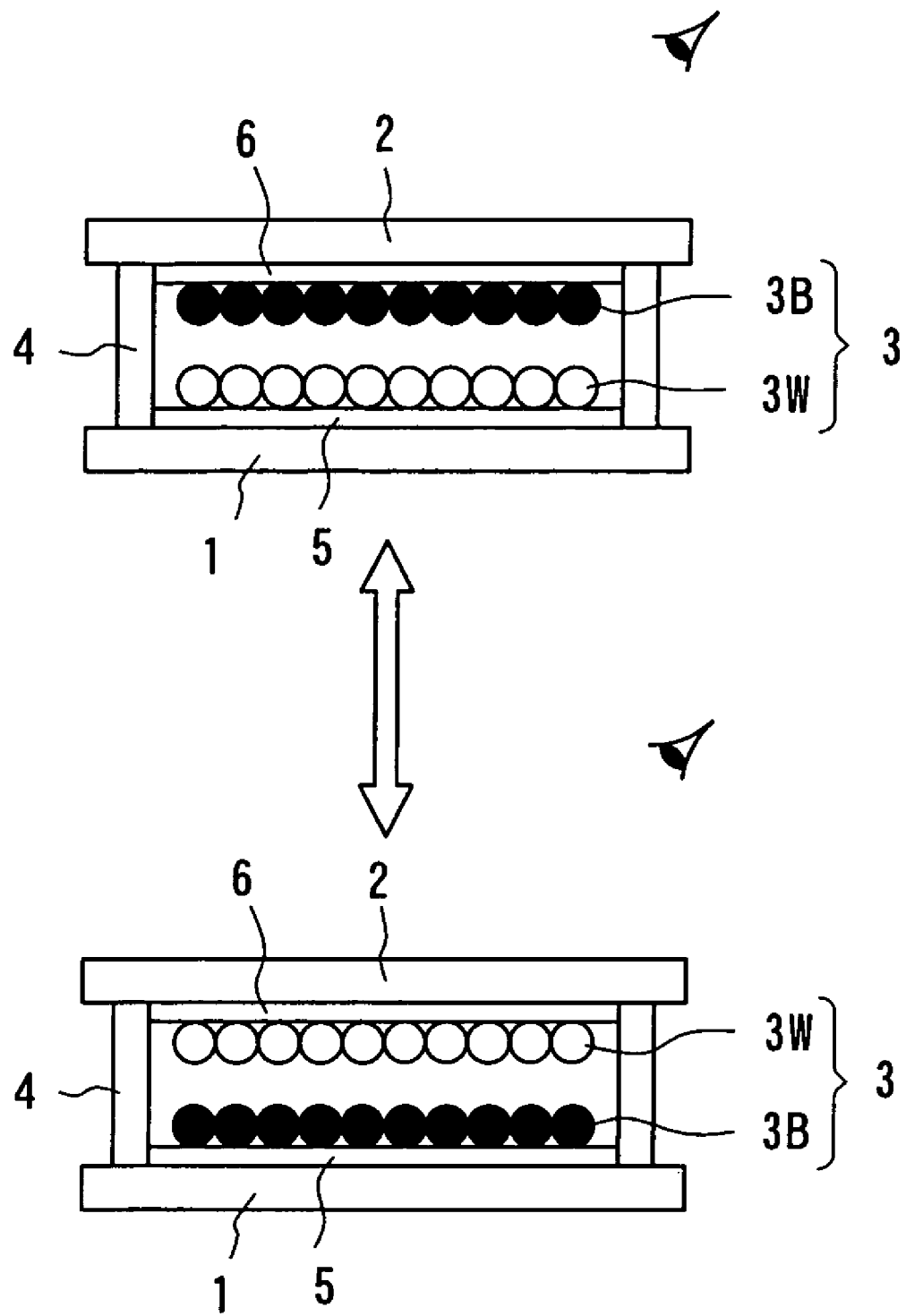
FIG. 5 is a schematic view showing another embodiment of an image display panel according to the second invention.
Figure 6:
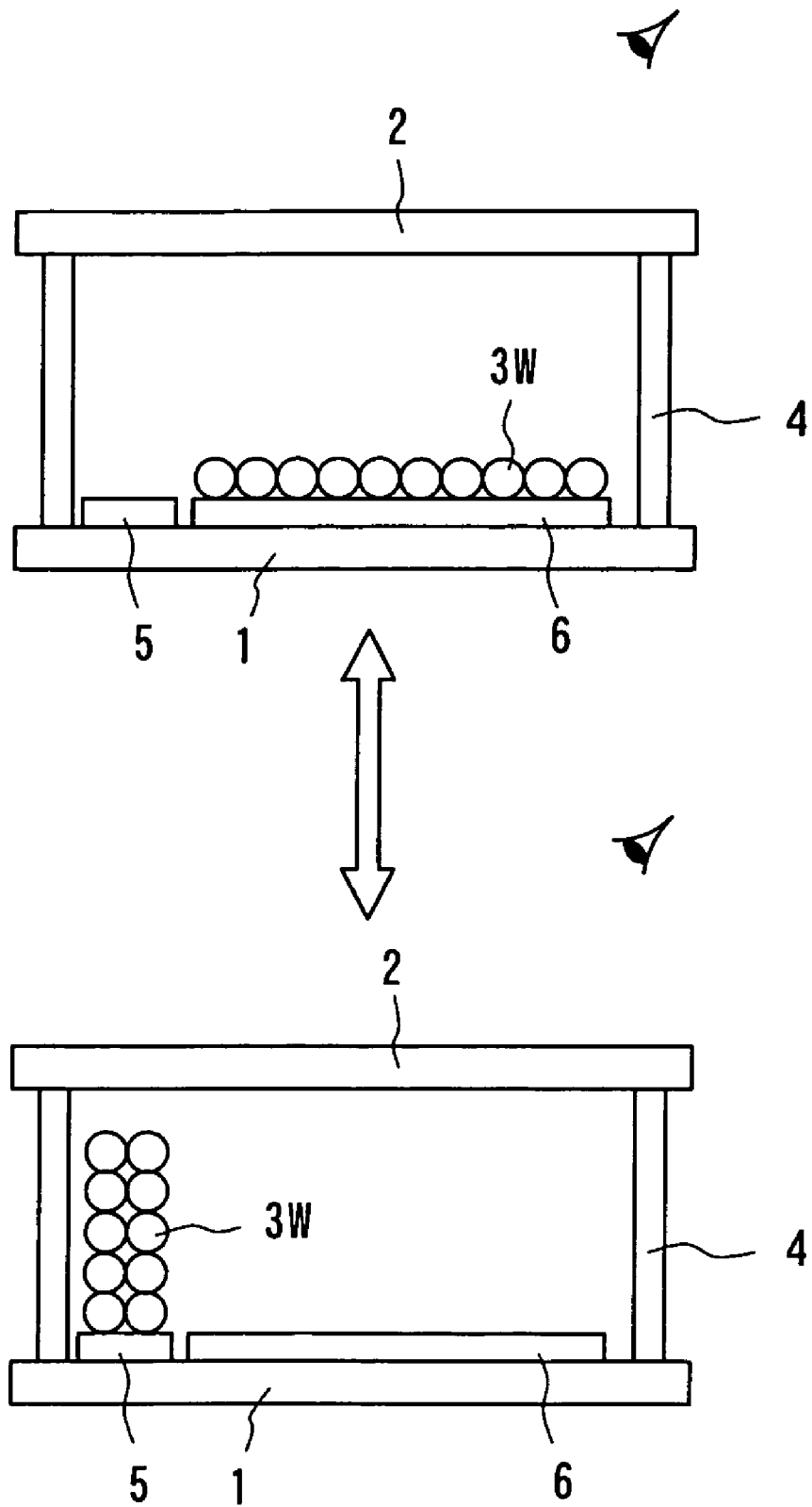
FIG. 6 is a schematic view illustrating still another embodiment of an image display panel according to the second invention.

Among the image display panels used in the image display device according to the second invention, the example using the particles will be explained with reference to FIGS. 4-6. In an example shown in FIG. 4, two or more groups of image display media 3 having different colors (here, white particles 3W and black particles 3B) are made to move in a vertical direction with respect to the substrates 1, 2 in response to an electrostatic field applied from outside of the substrates 1, 2 so as to display a black color by viewing the black particles 3B to an observer or to display a white color by viewing the white particles 3W to an observer. Moreover, partition walls 4 are formed for example in a grid manner between the substrates 1 and 2 so as to form display cells. In an example shown in FIG. 5, two or more groups of image display media 3 having different colors (here, white particles 3W and black particles 3B) are made to move in a vertical direction with respect to the substrates 1, 2 in response to an electrostatic field generated by applying a voltage between an electrode 5 arranged on the substrate 1 and an electrode 6 arranged on the substrate 6 so as to display a black color by viewing the black particles 3B to an observer or to display a white color by viewing the white particles 3W to an observer. Moreover, partition walls 4 are formed for example in a grid manner between the substrates 1 and 2 so as to form display cells. In an example shown in FIG. 6, one group of image display media 3 having a color (here, white particles 3) are made to move in a horizontal direction with respect to the substrates 1, 2 in response to an electrostatic field generated by applying a voltage between the electrode 5 and the electrode 6 arranged on the substrate 1 so as to display a white color by viewing the white particles 3W to an observer or to display a color of the electrode 6 or the substrate 1 by viewing a color of the electrode 6 or the substrate 1 to an observer. The same explanation can be applied, as it is, if the white particles 3W are substituted for white liquid powders and the black particles 3B are substituted for black liquid powders.

A feature of a method of manufacturing an image display panel according to the second invention is to improve a method of manufacturing colored partition walls having exactly a predetermined pattern without causing a developing defect. Specifically, the manufacturing method comprises the steps of: forming a first layer made of photosensitive color composite on one substrate; forming a second layer made of photosensitive composite, which has a light transmission higher than that of the first layer and a thickness larger than that of the first layer, on the first layer; performing an exposure through a mask with respect to the first layer and the second layer on the substrate; and performing a developing and a washing with respect to the exposed first and second layers so as to form color partition walls on the substrate. Further specifically, a light transmission of the photosensitive color composite forming the first layer in a wavelength band of visible light (380 nm-780 nm) is not larger than 20%, and a light transmission of the photosensitive composite forming the second layer in a wavelength band of 300 nm-450 nm is not less than 20%. Here, the reason for limiting a light transmission of the photosensitive color composite forming the first layer in a wavelength band of visible light (380 nm-780 nm) to not larger than 20% is that, if it exceeds 20%, an effect of improving visibility is decreased. Moreover, the reason for limiting a light transmission of the photosensitive composite forming the second layer in a wavelength band of 300 nm-450 nm to not less than 20% is that, if it is less than 20%, a light is difficult to be transmitted and thus it is difficult to form the partition walls having thick (higher height) partition walls. Moreover, as the photosensitive color composite and the photo-sensitive composite, use is made of materials of acrylic series, epoxy series, polyimide series, and any photosensitive materials can be applied only if it can be applied to a developing film formation.

Hereinafter, a method of manufacturing the image display panel according to the second invention will be explained.

Figure 7:
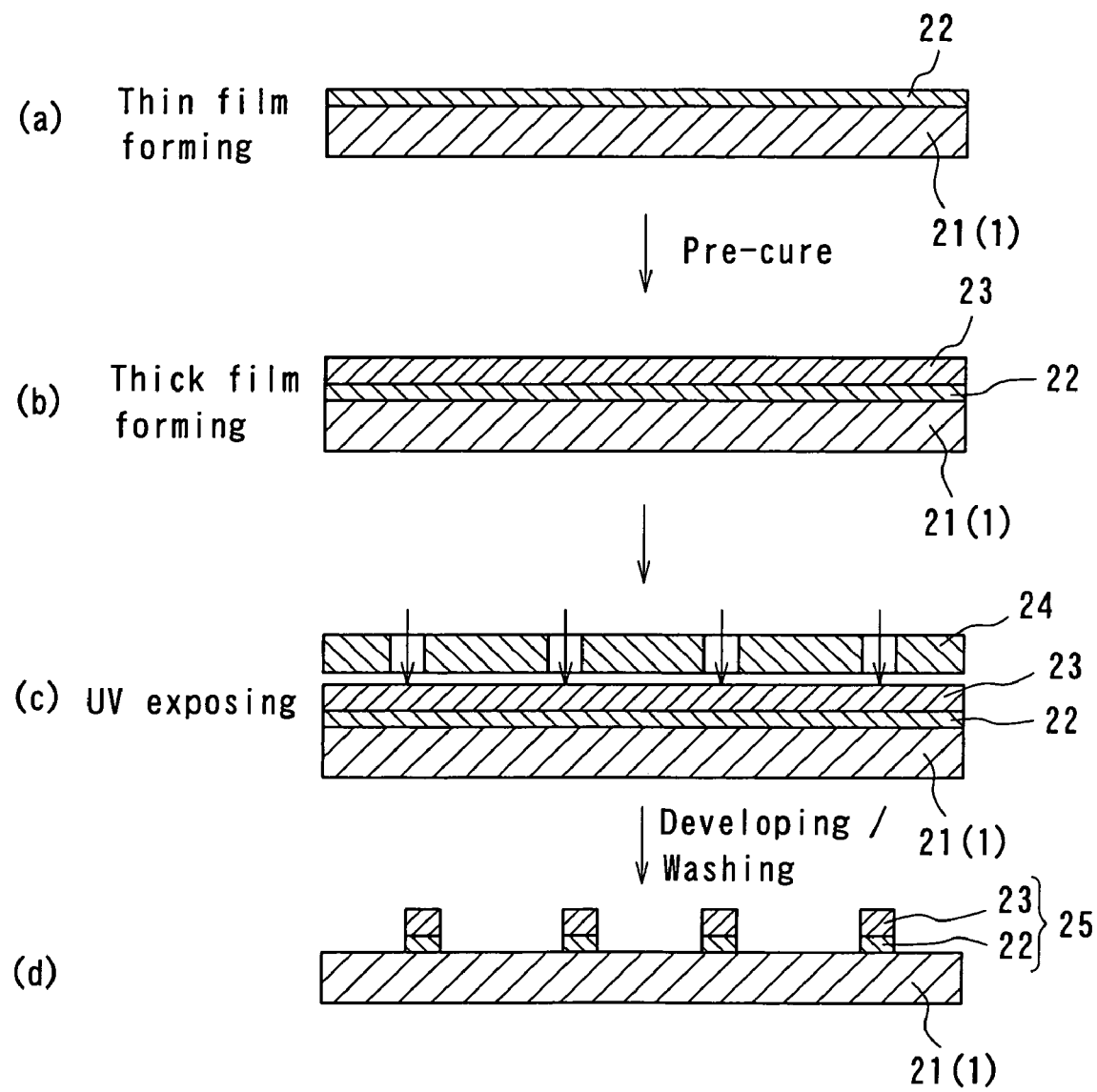
FIG. 7a-7d are schematic views respectively explaining respective steps of one embodiment of a method of manufacturing an image display panel according to the second invention.

FIGS. 7a-7d are schematic views respectively explaining respective steps of one embodiment of a method of manufacturing an image display panel according to the second invention. The method of manufacturing the image display panel according to the second invention will be explained with reference to FIGS. 7a-7d. At first, as shown in FIG. 7a, a film of for example black photosensitive resist is formed on an ITO glass substrate 21 as the rear substrate 1 by means of spin-coater so as to form a thin film 22 (first layer) having a thickness of 1 μm on the ITO glass substrate 21. It is preferred to set a thickness of the thin film 22 to a range of 0.1-10 μm. According to a thickness of the film to be formed, a weight concentration of the black substance in the resist is suitably adjusted so as to make a light transmission of the thus formed film in a wavelength band of visible light (380 nm-780 nm) to not larger than 20%.

Then, a pre-cure operation is performed with respect to the thin film 22 under the condition of for example 100° C.×2 minutes so as to evaporate a solvent, so that a hard film (not reacted), which is durable for the following lamination, can be obtained. Then, as shown in FIG. 7b, a dry film resist having a thickness of 50 μm and having a light transmission higher than that of the first layer is laminated on the thin film 22 so as to form a thick film 23 (second layer). As the dry film resist forming the thick film 23, use is made of ALPHO NIT2 (product of Nichigo-Morton Co., Ltd.) or PDF 300 (product of Nippon Steel Chemical Group) by way of example. Moreover, it is preferred that a thickness of the thick film 23 is in a range of 10-200 μm.

Then, as shown in FIG. 7c, a mask 24 having openings, at which the partition walls are to be formed, is set on the thick film 23, and then a UV exposure operation is performed through the mask 24 so as to harden only the portions of the thick film 23 and the thin film 22, at which the partition walls are to be formed. After that, the mask 24 is removed and a developing/washing operation is performed, so that color partition walls 25, made of the thin film 22 of for example black color having a low light transmission ant the thick film 23 of a transparent or translucent state having a high light transmission, are formed on the ITO glass substrate 21, as shown in FIG. 7d. Finally, the front substrate 2 is connected on the color partition walls 25 by using an adhesive and so on, so that the image display panel according to the invention can be obtained.

In the embodiments mentioned above, the color partition walls 25 are formed on the ITO glass substrate 21 consisting of the rear substrate 1, but the color partition walls 25 may be formed on an ITO glass substrate consisting of the front substrate 2.

FIGS. 8a-8d are schematic views respectively explaining respective steps of another embodiment of a method of manufacturing an image display panel according to the second invention. The method of manufacturing the image display panel according to the second invention will be explained with reference to FIGS. 8a-8d. At first, as shown in FIG. 8a, a layer 32 with a thick thickness having a high light transmission and a layer 33 with a thickness thinner than that of the layer 32 having a low light transmission are applied on a substrate 31 made of PET and so on, so as to obtain a two-layer dry film resist 34. In this case, the layer 32 and the layer 33 are formed separately, but they may be formed integrally in a laminated state.

Then, as shown in FIG. 8b, the two-layer dry film resist 34 is laminated on a glass substrate 35 in such a manner that the layer 33 is opposed to the glass substrate 35. Then, as shown in FIG. 8c, a mask 36 having openings, at which the partition walls are to be formed, is set on the substrate 31, and then a UV exposure operation is performed through the mask 36 so as to harden only the portions of the layer 33 and the layer 32, at which the partition walls are to be formed. After that, the mask 36 is removed and a developing/washing operation is performed, so that color partition walls 37 made of the layer 33 and the layer 32 are formed on the glass substrate 35, as shown in FIG. 8d. Finally, the opposed substrate is connected on the color partition walls 37 by using an adhesive and so on, so that the image display panel according to the invention can be obtained. In this case, it is preferred that the layer 33 is a black layer and the layer 32 is a transparent layer.

Hereinafter, a resist material used for forming the partition walls will be explained.

The resist material for the partition walls has a light hardening resin as a main ingredient, and sometimes includes thermosetting resin, inorganic powder, solvent, additives and so on. As the light hardening resin, it is preferred to use a resin of acrylic series, but any other resins may be used if only they are hardened by a light such as ultraviolet light and so on. As the inorganic powder, use is made of ceramic powder, glass powder or a combination of one or more kinds of them.

Typical ceramic powder includes ceramic oxides such as $ZrO_2$, $Al_2O_3$, CuO, MgO, $TiO_2$, ZnO and so on, and ceramic non-oxides such as SiC, AlN, $Si_3O_4$ and so on.

Typical glass powder includes a substance obtained by melting raw materials having $SiO_2$, $Al_2O_3$, $B_2O_3$, $Bi_2O_3$, ZnO and so on, and cooling and grinding the melted raw materials. In this case, it is preferred that a glass transition point Tg is 300-500° C. In this glass transition temperature range, since the firing step can be performed at a relatively low temperature, there is a merit that resin damage is small.

Here, it is preferred that a particle size distribution Span of the inorganic powder, which is defined by the following formula, is not more than 8 more preferably not more than 5:

$$\text{Span} = (d(0.9) - d(0.1))/d(0.5);$$

(here, d(0.5) means a value of the particle size expressed by μm wherein an amount of the particles having the particle size larger than or smaller than this value is 50%, d(0.1) means a value of the particle size expressed by μm wherein an amount of the particles having the particle size smaller than this value is 10%, and d(0.9) means a value of the particle size expressed by μm wherein an amount of the particles having the particle size smaller than this value is 90%).

By setting a value of Span to not more than 8, it is possible make a size of the inorganic powder in the pastes even. Therefore, if the processes of application to hardening for the pastes are repeated to make a lamination, it is possible to form accurately the partition wall.

Moreover, it is preferred that the average particle size d(0.5) of the inorganic powder in the pastes is 0.1-20 μm more preferably 0.3-10 μm. By doing so, it is also possible to form accurately the partition wall if the above processes are repeated to make a lamination.

Here, the particle size distribution and the particle size mentioned above can be measured by means of a laser diffraction/scattering method. When a laser light is incident upon the particles to be measured, a light intensity distribution pattern due to a diffraction/scattering light occurs spatially. This light intensity distribution pattern corresponds to the particle size, and thus it is possible to measure the particle size and the particle size distribution.

In the present invention, it is defined that the particle size and the particle size distribution are obtained by a volume standard distribution. Specifically, the particle size and the particle size distribution can be measured by means of a measuring apparatus Mastersizer 2000 (Malvern Instruments Ltd.) wherein the particles setting in a nitrogen gas flow are calculated by an installed analysis software (which is based on a volume standard distribution due to Mie's theory).

As the thermosetting resin, which is used in the case that the light hardening resin as a main ingredient of the resist material for the partition walls includes the thermosetting resin, use is made of any thermosetting resins if predetermined partition walls can be formed. If required solid state properties of the partition wall are considered, it is preferred to use a resin having a high molecular weight and a high glass transition point Tg. For example, it is preferred to use resins of acrylic-series, styrene-series, epoxy-series, urethane-series, polyester-series, and urea-series and it is especially preferred to use the resins of acrylic-series, epoxy-series, urethane-series, and polyester-series.

As the solvent added in the resist for the partition walls, use is made of any solvent if it can dissolve the inorganic powder and the resin used for the resist material. Typical examples of such a solvent are aromatic solvents such as ester phthalate, toluene, xylene, benzene; alcoholic solvents such as oxyalcohol, hexanol, octanol; and ester solvents such as ester acetate and so on.

In addition, according to need, it is possible to add dye, polymerization prevention agents, plasticizer, gum, dispersant, oxidation inhibitor, hardening agents, hardening accelerator, and sedimentation prevention agents.

<Third invention>

Figure 9:
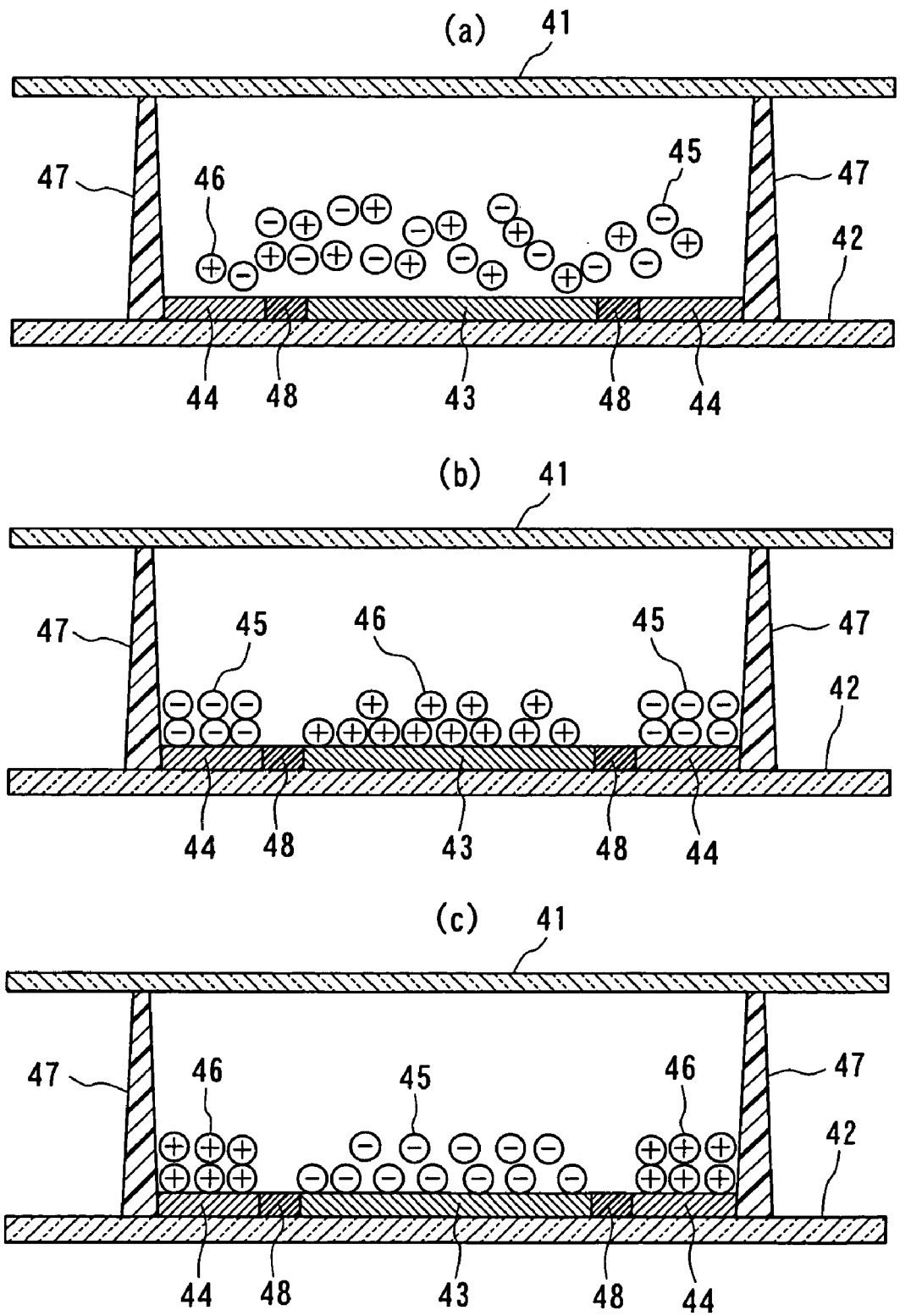
FIG. 9a-9c are schematic views respectively depicting one embodiment of an display panel in an image display device according to the third invention and explaining its display theory.
Figure 11:
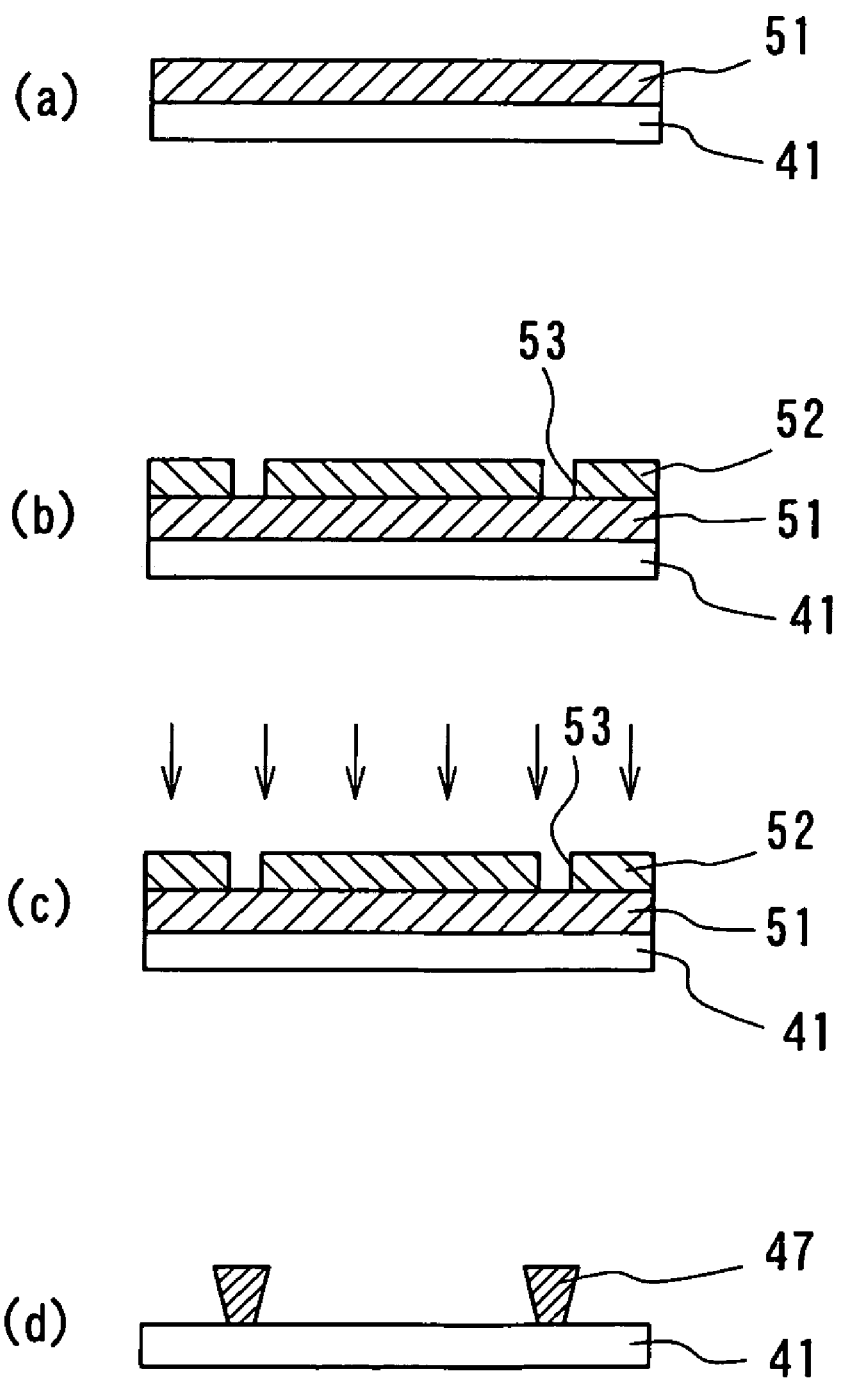
FIG. 11a-11d are schematic views respectively explaining one embodiment of a partition wall manufacturing by a photolithography method according to the third invention.

At first, a basic construction of the image display device according to the third invention will be explained. FIGS. 9a-9c are schematic views respectively showing one embodiment of the image display panel used for the image display device according to the invention and its display driving method. In the image display device according to the invention shown in FIG. 9a, a negatively chargeable particle 45 and a positively chargeable particle 46 are arranged between opposed front substrate 41 (preferably transparent) and rear substrate 42 (transparent or opaque). Under such a state, when a voltage is applied in such a manner that a side of a display electrode 43 becomes low potential and a side of an opposed electrode 44 becomes high potential, as shown in FIG. 9b, the positively chargeable particles 46 move to the side of the display electrode 43 and the negatively chargeable particles 45 move to the side of the opposed electrode 44 by means of Coulomb's force. In this case, a display face viewed from a side of the front substrate 41 looks like a color of the positively chargeable particles 46. Next, when a voltage is applied in such a manner that the side of the display electrode 43 becomes high potential and the side of the opposed electrode 44 becomes low potential by reversing potentials, as shown in FIG. 9c, the negatively chargeable particles 45 move to the side of the display electrode 43 and the positively chargeable particles 46 move to the side of the opposed electrode 44 by means of Coulomb's force. In this case, the display face viewed from the side of the front substrate 41 looks like a color of the negatively chargeable particles 45. Here, a numeral 47 is a partition wall and a numeral 48 is an insulator.

The display states shown in FIGS. 9b and 9c are repeatedly changeable only by reversing the potentials of a power source, and thus it is possible to change colors on the display face reversibly by reversing the potentials of the power source as mentioned above. The colors of the particles can be arbitrarily selected. For example, when the negatively chargeable particles 45 are white color and the positively chargeable particles 46 are black color, or, when the negatively chargeable particles 45 are black color and the positively chargeable particles 45 are white color, a reversible image display between white color and black color can be performed. In this method, since the particles are once adhered to the electrode by means of an imaging force, a display image can be maintained for a long time after a voltage apply is stopped, thereby showing an excellent memory property. The same explanation can be applied, as it is, if the white particles 3W are substituted for white liquid powders and the black particles 3B are substituted for black liquid powders.

A feature of the image display device according to the third invention is that the partition walls 47 are manufactured by a photolithography method, and a shape of the partition wall 47 is a taper shape such that a width of an end portion at a side of the rear substrate is larger than that at a side of the front substrate.

At first, the partition wall 47 having the taper shape will be explained. Respective cells are formed by the partition walls 47 arranged between the front substrate 41 and the rear substrate 42. At that time, a shape of the partition wall 47 is constructed in such a manner that an end width w2 at a side of the rear substrate 42 is larger than an end width w1 at a side of the transparent electrode 41. FIGS. 10a and 10b are longitudinal cross sectional views showing one embodiment of a shape of the partition wall 47 formed in the image display device according to the third invention. Normally, as shown in FIG. 10a, the taper shape have a trapezoidal cross section such that the end width w2 at a side of the rear substrate 42 is larger than the end width w1 at a side of the front substrate 41, preferably, a trapezoidal cross section such that a ratio of w1/w2 between the width w2 and the width w1 is not larger than 0.5. In this case, as shown in FIG. 10b, a substantially triangular cross section, such that the end width w1 is approximately 0, can be utilized. If the ratio is close to 0, the end width w1 becomes close to 0 accordingly. In this case, an effect of enlarging a display area can be improved, but, if it is close to 0 excessively, a connection between the front substrate 41 and the partition wall 47 becomes sometimes insufficient. Therefore, it is necessary to determine the end width w1 with taking into account of a connection state.

If optimizing a shape of the partition wall 47 in this manner, it is possible to make the end width w1 of the partition wall 47 at a side of the front substrate 41 smaller, as compared with a conventional example wherein a cross section of the partition wall 47 is rectangular and the end width w1 of the partition wall 47 at a side of the front substrate 41 is equal to the end width w2 of the partition wall at a side of the rear substrate 42. Therefore, an opening rate of the front substrate 41 can be made larger, and a display area can be also made larger. In addition, since it is possible to make the end width w2 of the partition wall 47 at a side of the rear substrate 42 larger, a connection area between the rear substrate 42 and the partition wall 47 can be made larger. Therefore, it is possible to make connection strength between the rear substrate 42 and the partition wall 47 higher. Moreover, when the particles are filled in a space of the cell surrounded by the partition walls 47 on the rear substrate 42, it is possible to make an opening rate of the space larger as compared with the conventional example mentioned above.

Then, a method of manufacturing the partition wall 47 having the taper shape mentioned above be means of a photolithography method will be explained. FIGS. 11a-11d are schematic views respectively explaining one embodiment of the partition wall manufacturing by a photolithography method according to the third invention. At first, a photosensitive material is manufactured. Then, a photosensitive material 51 thus manufactured is applied on the front substrate 41 as a resist film (referred to FIG. 11a). This photosensitive material applying operation may be performed with respect to the front substrate 41, on which a transparent electrode pattern is previously formed, according to need. Then, a photo mask 52 is arranged on the resist film made of the laminated photosensitive material 51 (referred to FIG. 11b). The photo mask 52 has openings 53 through which a light can be irradiated only to portions of the photosensitive material 51 at which the partition walls are to be formed. Then, under such a condition, a light is irradiated from above so as to expose a light only to the portions corresponding to the partition walls 47, so that the portions of the photosensitive material 51 are hardened (referred to FIG. 11c). In this case, the above operation is repeated according to need till a desired height of the partition walls. Then, non-hardened portions of the photosensitive material 51 are removed by developing, so that the partition walls 47 are manufactured (referred to FIG. 11d). In this case, hardened portions of the photosensitive material 51 forming the partition walls 47 may be sintered according to need.

Figure 12:
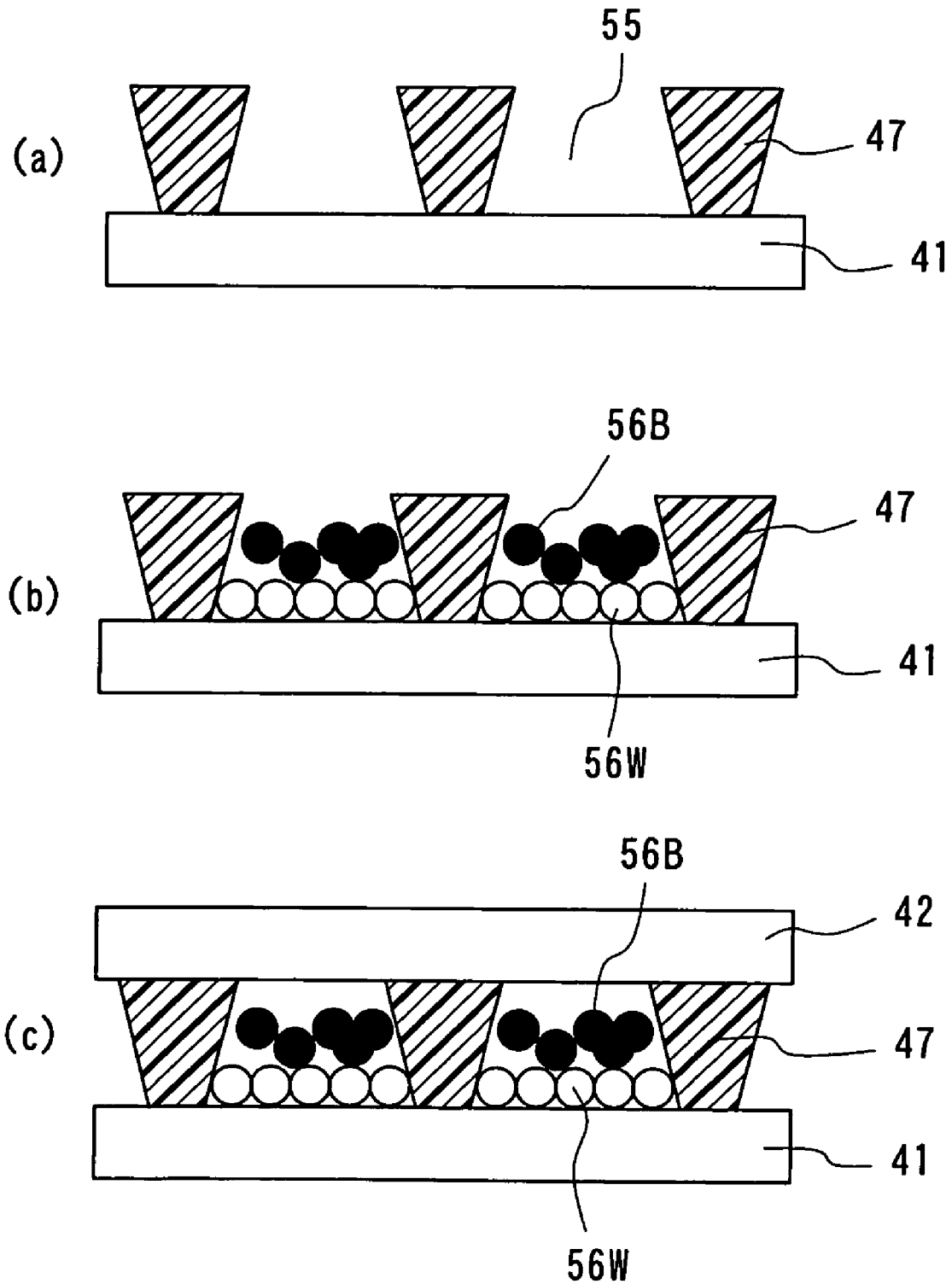
FIG. 12a-12c are schematic views respectively explaining one embodiment of a method of manufacturing an image display device according to the third invention after forming the partition walls.

FIGS. 12a-12c are schematic views respectively explaining one embodiment of a method of manufacturing an image display device according to the third invention after forming the partition walls. That is, predetermined image display media (here, white particles 56W and black particles 56B, having different charge characteristics with each other) are sealed (referred to FIG. 12b) in cells 55 between the partition walls 47 formed on the front substrate 41 as mentioned above (referred to FIG. 12a). Then, the rear substrate 42 and the partition walls 47 are connected (referred to FIG. 12c). In this manner, it is possible to obtain the image display panel used for the image display device according to the invention. In the image display device according to the invention, connection portions between the front substrate 41 and the partition walls 47 can be made smaller, a connection strength can be maintained and an opening rate on the display surface can be improved. At the same time, an adhesion area between the rear substrate 42 and the partition walls 47 can be made larger, and thus it is possible to improve adhesion reliability between the rear substrate and the partition walls by maintaining a large adhesion area.

In the image display device according to the third invention, it is necessary to form the partition walls 47 having a taper shape such that the end width at a side of the rear substrate is larger than the end width at a side of the front substrate by means of the photolithography method mentioned above. In case of using a photolithography method, it is possible to manufacture the partition walls 47 having a reverse taper shape on the front substrate 41 by performing the general photolithography method repeatedly by increasing gradually a size of the opening 53 of the photo mask 52. However, in this case, the number of steps is slightly increased. Therefore, it is preferred to utilize a photolithography method as follows.

Figure 13:
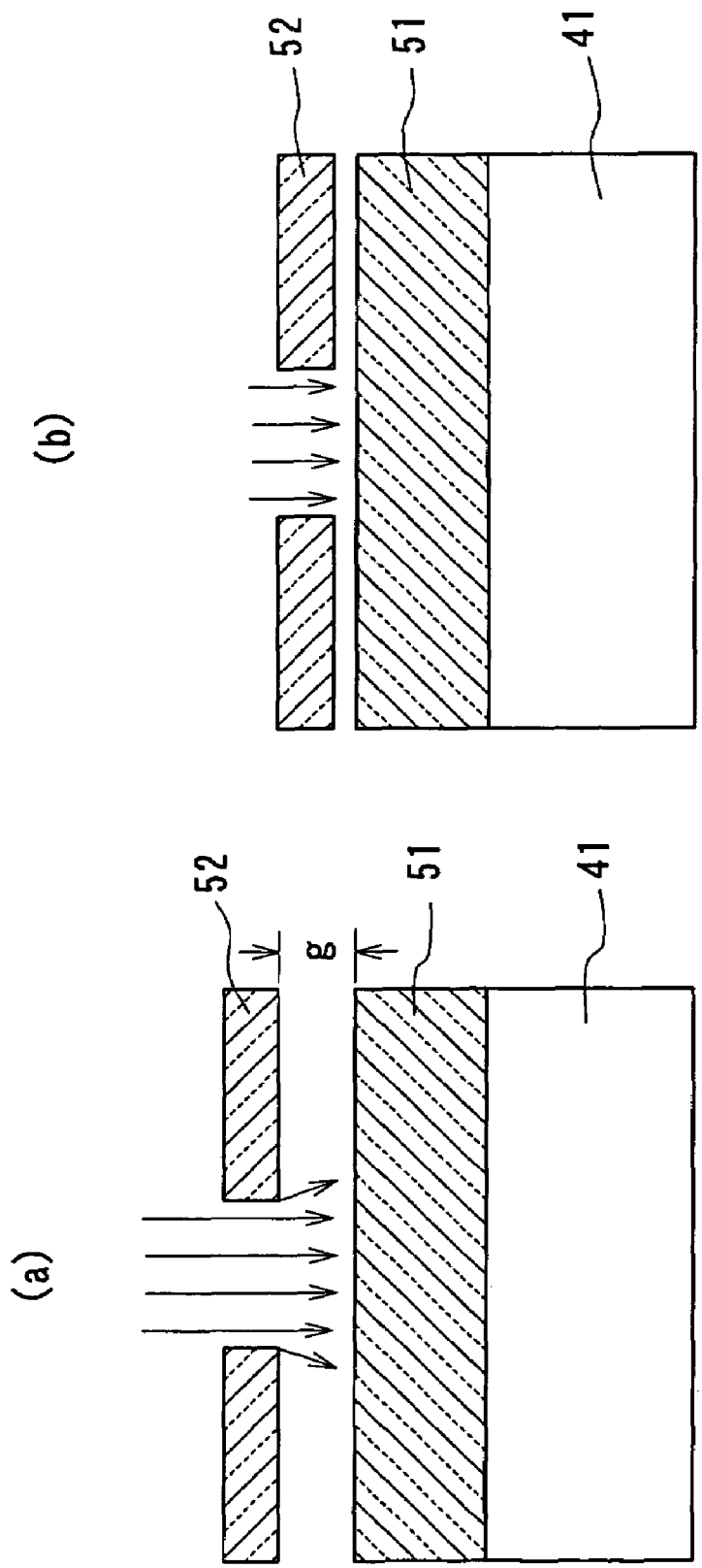
FIG. 13a and 13b are schematic views respectively explaining a preferred embodiment of a photolithography method using a partition wall manufacturing of an image display device according to the third invention.
Figure 14:
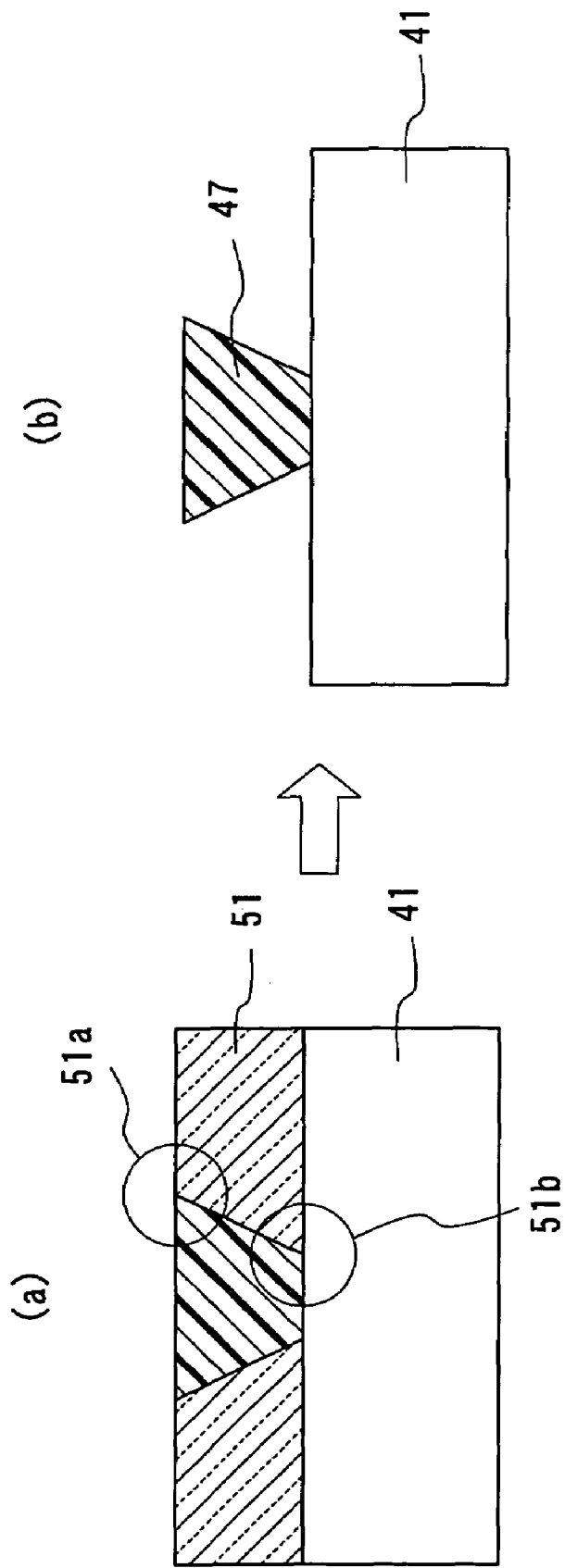
FIG. 14a and 14b are schematic views respectively explaining a function of the preferred photolithography method shown in FIGS. 13a and 13b.

FIGS. 13a and 13b are schematic views respectively explaining a preferred embodiment of the photolithography method used for manufacturing the partition walls of the image display device according to the third invention. At first, in the embodiment shown in FIG. 13a, in order to manufacture the partition walls 47 having a reverse taper shape by means of a photolithography method, a light is intentionally diffused by means of a proximity exposure in which a gap g is arranged between the photo mask 52 and the photosensitive material 51, so that a reverse taper shape can be applied to the partition walls 47. In this embodiment, since the gap g between the photo mask 52 and the photosensitive material 51 is made intentionally wider so as to diffuse a light, it is possible to increase an amount of exposure light at a center portion. Then, in the embodiment shown in FIG. 13b, in order to manufacture the partition walls 47 having a reverse taper shape by means of a photolithography method, an exposure is performed by a low amount of exposure light so as to react a hardening agent only at a surface portion, so that a reverse taper shape can be applied to the partition walls 47. In this embodiment, it is possible to generate acids or its radicals of a hardening agent that is a photo initiator at a center portion of the surface. In both methods, as shown in FIG. 13a, a developing speed can be made slower at a portion 51a apart from the front substrate 41, which is firstly exposed, while a developing speed can be made faster at a portion 51b near the front substrate 41, which is finally exposed. As a result, as shown in FIG. 13b, it is possible to form easily the partition walls 47 having a reverse taper shape on the front substrate 41.

The material for the partition walls includes a light hardening, and sometimes includes thermosetting resin, inorganic powder, solvent, additives and so on. As the inorganic powder, use is made of ceramic powder, glass powder or a combination of one or more kinds of them.

Typical ceramic powder includes ceramic oxides such as $ZrO_2$, $Al_2O_3$, CuO, MgO, $TiO_2$, ZnO and so on, and ceramic non-oxides such as SiC, AlN, $Si_3O_4$ and so on.

Typical glass powder includes a substance obtained by melting raw materials having $SiO_2$, $Al_2O_3$, $B_2O_3$, $Bi_2O_3$, ZnO and so on, and cooling and grinding the melted raw materials. In this case, it is preferred that a glass transition point Tg is 300-500° C. In this glass transition temperature range, since the firing step can be performed at a relatively low temperature, there is a merit that resin damage is small.

Here, it is preferred that a particle size distribution Span of the inorganic powder, which is defined by the following formula, is not more than 8 more preferably not more than 5:

Span=(d(0.9)−d(0.1))/d(0.5)

(here, d(0.5) means a value of the particle size expressed by μm wherein an amount of the particles having the particle size larger than or smaller than this value is 50%, d(0.1) means a value of the particle size expressed by μm wherein an amount of the particles having the particle size smaller than this value is 10%, and d(0.9) means a value of the particle size expressed by μm wherein an amount of the particles having the particle size smaller than this value is 90%).

By setting a value of Span to not more than 8, it is possible make a size of the inorganic powder in the pastes even. Therefore, if the processes of application to hardening for the pastes are repeated to make a lamination, it is possible to form accurately the partition wall.

Moreover, it is preferred that the average particle size d(0.5) of the inorganic powder in the pastes is 0.1-20 μm more preferably 0.3-10 μm. By doing so, it is also possible to form accurately the partition wall if the above processes are repeated to make a lamination.

Here, the particle size distribution and the particle size mentioned above can be measured by means of a laser diffraction/scattering method. When a laser light is incident upon the particles to be measured, a light intensity distribution pattern due to a diffraction/scattering light occurs spatially. This light intensity distribution pattern corresponds to the particle size, and thus it is possible to measure the particle size and the particle size distribution.

In the present invention according to the third invention, it is defined that the particle size and the particle size distribution are obtained by a volume standard distribution. Specifically, the particle size and the particle size distribution can be measured by means of a measuring apparatus Mastersizer 2000 (Malvern Instruments Ltd.) wherein the particles setting in a nitrogen gas flow are calculated by an installed analysis software (which is based on a volume standard distribution due to Mie's theory).

As the resin added in the material for the partition walls, use is made of any resins if it includes the inorganic powder mentioned above and predetermined partition walls can be formed. If required solid state properties of the partition wall are considered, it is preferred to use a resin having a high molecular weight and a high glass transition point. For example, it is preferred to use resins of acrylic-series, styrene-series, epoxy-series, urethane-series, polyester-series, and urea-series and it is especially preferred to use the resins of acrylic-series, epoxy-series, urethane-series, and polyester-series.

As the solvent added in the material for the partition walls, use is made of any solvent if it can dissolve the inorganic powder and the resin. Typical examples of such a solvent are aromatic solvents such as ester phthalate, toluene, xylene, benzene; alcoholic solvents such as oxy-alcohol, hexanol, octanol; and ester solvents such as ester acetate and so on.

In addition, according to need, it is possible to add dye, polymerization prevention agents, plasticizer, gum, dispersant, oxidation inhibitor, hardening agents, hardening accelerator, and sedimentation prevention agents into the material for the partition walls.

Hereinafter, respective members constituting the image display device according to the invention will be explained in detail. In the explanations mentioned below, as to the portions overlapped with the explanations mentioned above, the explanations mentioned above have a priority over these portions. Moreover, as the reference numerals, the same reference numerals used in the image display panel constituting the image display device shown in FIGS. 1, 2, 4, 5 and 6.

With regard to the substrate, at least one substrate must be transparent front substrate 2 capable of recognizing the displaying color from outside of the display panel, and a material with large transmission factor of visible light and with excellent heat resistance is preferable. The rear substrate 1 may be transparent or opaque. The presence of flexibility as the substrate is selected appropriately by the usage, for example, the flexible materials are selected for the usage as an electronic paper and so on, and materials having no flexibility are selected for the usage as display units for portable devices such as cellular phones, PDAs, and notebook personal computers. Examples of the substrate material include polymer sheets such as polyethylene terephthalate, polyether sulfone, poly-ethylene, or polycarbonate, and inorganic sheets such as glass, quartz or so. The thickness of the substrate is preferably 2 to 5000 μm, more preferably 5 to 2000 μm. When the thickness is too thin, it becomes difficult to maintain strength and distance uniformity between the substrates, and when the thickness is too thick such as over 5000 μm, it is inconvenient as the image display panel of a thin type.

As the materials for forming the electrodes 5,6, metals such as aluminum, silver, nickel, copper and gold, or electroconductive metal oxides such as ITO, electroconductive tin oxide and electro-conductive zinc oxide, electroconductive polymer such as polyaniline, polypyrrole, polythiophene and so on are used. As the use is made of the method for forming the electrode, the method in which a thin film is formed by sputtering method, vacuum vapor deposition method, CVD (chemical vapor deposition) method, and coating method, or the method in which the mixed solution of an electroconductive agent with a solvent or a synthetic resin binder is applied. Additionally, the thickness of the electrode may be suitable unless the electro-conductivity is absent or any hindrance exists in optical transparency, and it is preferable to be 3 to 1000 nm, more preferable to be 5 to 400 nm. The material and the thickness of the electrode 5, which is arranged at a side of the rear substrate 1, and the electrode 6, which is not arranged at a side of the front substrate 2, are the same as those of the electrode 5 mentioned above, but it is not necessary to be transparent. In this case, the applied outer voltage may be superimposed with a direct current or an alternate current.

As the partition wall 4, the shape is suitably designed in accordance with a kind of the image display media used for the-display and is not restricted. However, it is preferred to set a width of the partition wall to 2-100 μm more preferably 3-50 μm and to set a height of the partition wall to 10-500 μm more preferably 10-200 μm. Moreover, as a method of forming the partition wall, use may be made of a double rib method wherein ribs are formed on the opposed substrates respectively and they are connected with each other and a single rib method wherein a rib is formed on one of the opposed substrates only. The present invention may be preferably applied to both methods mentioned above.

Figure 15:
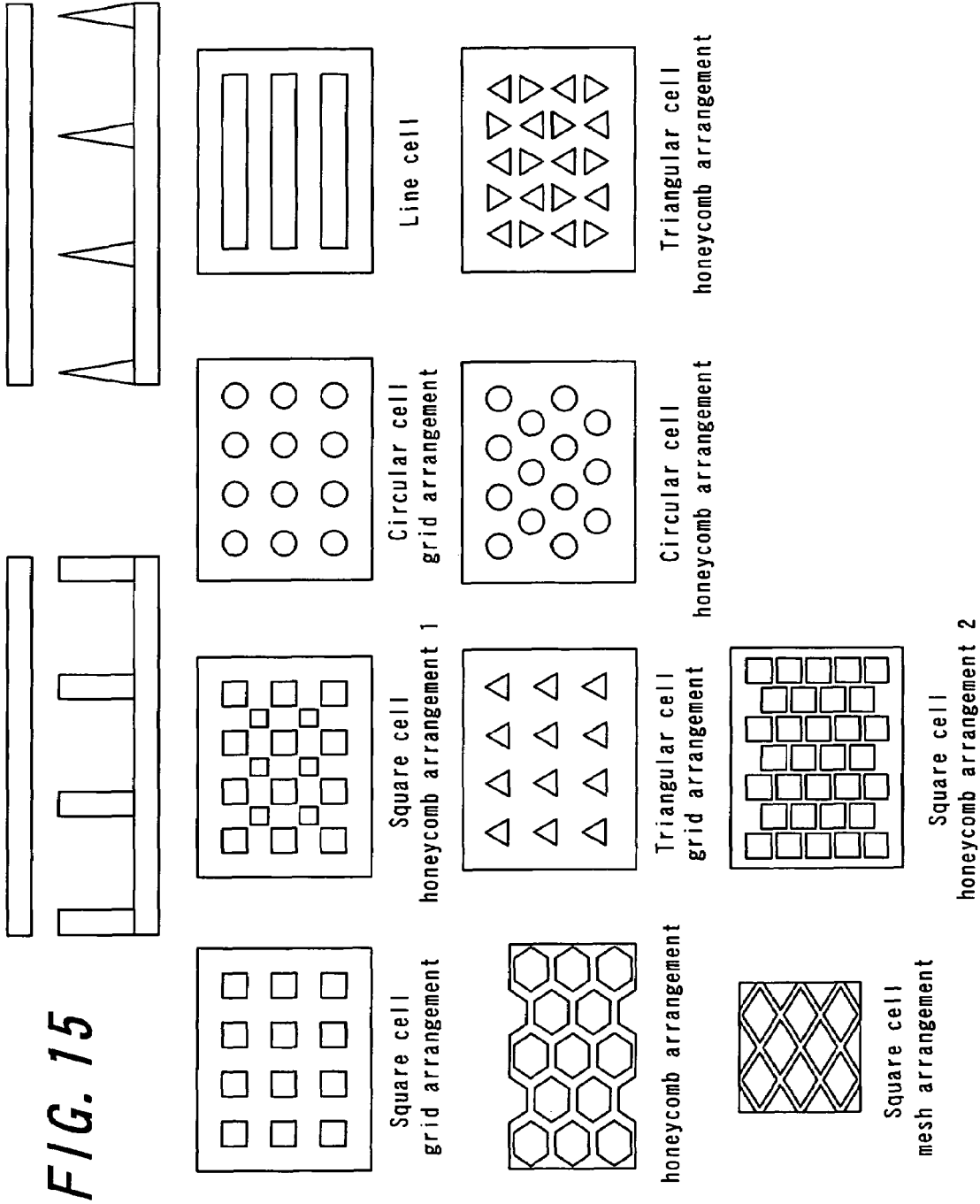
FIG. 15 is a schematic view illustrating one embodiment of a shape of partition walls in the image display panel used in the image display device according to the invention.

The display cell formed by the partition walls each made of rib has a square shape, a triangular shape, a line shape, a circular shape and a hexagon shape, and has an arrangement such as a grid, a honeycomb and a mesh, as shown in FIG. 15 viewed from a plane surface of the substrate. It is preferred that the portion corresponding to a cross section of the partition wall observed from the display side (an area of the frame portion of the display cell) should be made as small as possible. In this case, a clearness of the image display can be improved. Here, the formation method of the partition wall is not particularly restricted, however, a screen-printing method, a die transferring method, a sandblast method, a photolithography method and an additive method. Among them, it is preferred that the photolithography method utilizing a resist film and the die transferring method are used.

In the case of arranging the partition walls with a honeycomb structure as mentioned above, the following effects can be obtained. At first, when a pitch (corresponding to an interval between the partition walls in this case) is set to 300 μm in the case of forming the partition walls in such a manner that the display cells having a square shape are arranged as a grid structure, the rib is washed out by the developing process of forming the partition walls (ribs) by for example the photolithography method, if the rib width is made thin. Therefore, the rib width is limited to 20 μm. On the other hand, when a pitch (corresponding to an interval between centers of the display cells having a hexagonal shape in this case) is set to 300 μm in the case of forming the partition walls in such a manner that the display cells having a hexagonal shape are arranged as a honeycomb structure, the rib having the honeycomb structure has a high strength, and thus the rib structure can be maintained by the developing process as compared with the example of the grid structure. Therefore, it is possible to make the rib width to 8 μm. Moreover, it is further possible to make the rib width to 2 μm according to a combination of the rib and the pitch. As a result, the image display panel having a high opening rate can be obtained.

Then, particles used as the image display media utilized for displaying in the image display panel will be explained.

As the particles, although any of colored particles negatively or positively chargeable having capability of flying and moving by Coulomb's force are employable, spherical particles with light specific gravity are particularly preferable. The particles have a single color, and white or black particles are preferably used. The average particle diameter is preferable to be 0.1 to 50 μm, particularly to be 1 to 30 μm. When the particle diameter is less than this range, charge density of the particles will be so large that an imaging force to an electrode and a substrate becomes too strong; resulting in poor following ability at the inversion of its electric field, although the memory characteristic is favorable. On the contrary, when the particle diameter exceeds the range, the following ability is favorable, however, the memory characteristic will degrade.

If the particles satisfy electrostatic property and so on, the particles may be formed by any materials. For example, it is formed by resin, charge control agent, coloring agent, inorganic additive and so on, or, by coloring agent and so on only.

Typical examples of the resin include urethane resin, urea resin, acrylic resin, polyester resin, acryl urethane resin, acryl urethane silicone resin, acryl urethane fluorocarbon polymers, acryl fluorocarbon polymers, silicone resin, acryl silicone resin, epoxy resin, polystyrene resin, styrene acrylic resin, polyolefin resin, butyral resin, vinylidene chloride resin, melamine resin, phenolic resin, fluorocarbon polymers, polycarbonate resin, polysulfon resin, polyether resin, and polyamide resin. Two kinds or more of these may be mixed and used. For the purpose of controlling the attaching force with the substrate, acryl urethane resin, acryl silicone resin, acryl fluorocarbon polymers, acryl urethane silicone resin, acryl urethane fluorocarbon polymers, fluorocarbon polymers, silicone resin are particularly preferable.

Examples of the electric charge control agent include, but not particularly specified to, negative charge control agent such as salicylic acid metal complex, metal containing azo dye, oil-soluble dye of metal-containing (containing a metal ion or a metal atom), the fourth grade ammonium salt-based compound, calixarene compound, boron-containing compound (benzyl acid boron complex), and nitroimidazole derivative. Examples of the positive charge control agent include nigrosine dye, triphenylmethane compound, the fourth grade ammonium salt compound, polyamine resin, imidazole derivatives, etc. Additionally, metal oxides such as ultra-fine particles of silica, ultra-fine particles of titanium oxide, ultra-fine particles of alumina, and so on; nitrogen-containing circular compound such as pyridine, and so on, and these derivates or salts; and resins containing various organic pigments, fluorine, chlorine, nitrogen, etc. can be employed as the electric charge control agent.

As for a coloring agent, various kinds of organic or inorganic pigments or dye as will be described below are employable.

Examples of black pigments include carbon black, copper oxide, manganese dioxide, aniline black, and activate carbon. Examples of yellow pigments include chrome yellow, zinc chromate, cadmium yellow, yellow iron oxide, mineral first yellow, nickel titanium yellow, navel orange yellow, naphthol yellow S, hanzayellow G, hanzayellow 10G, benzidine yellow G, benzidine yellow GR, quinoline yellow lake, permanent yellow NCG, and tartrazine lake. Examples of orange pigments include red chrome yellow, molybdenum orange, permanent orange GTR, pyrazolone orange, Balkan orange, Indanthrene brilliant orange RK, benzidine orange G, and Indanthrene brilliant orange GK. Examples of red pigments include red oxide, cadmium red, diachylon, mercury sulfide, cadmium, permanent red 4R, lithol red, pyrazolone red, watching red, calcium salt, lake red D, brilliant carmine 6B, eosin lake, rhodamine lake B, alizarin lake, and brilliant carmine 3B.

Examples of purple pigments include manganese purple, first violet B, and methyl violet lake. Examples of blue pigments include Berlin blue, cobalt blue, alkali blue lake, Victoria blue lake, phthalocyanine blue, metal-free phthalocyanine blue, partially chlorinated phthalocyanine blue, first sky blue, and Indanthrene blue BC. Examples of green pigments include chrome green, chromium oxide, pigment green B, Malachite green lake, and final yellow green G. Further, examples of white pigments include zinc white, titanium oxide, antimony white, and zinc sulphide.

Examples of extenders include baryta powder, barium carbonate, clay, silica, white carbon, talc, and alumina white. Furthermore, there are Nigrosine, Methylene Blue, rose, Bengal, quinoline yellow, and ultramarine blue as various dyes such as basic dye, acidic dye, dispersion dye, direct dye, etc. These coloring agents may be used alone or in combination of two or more kinds thereof. Particularly, carbon black is preferable as the black coloring agent, and titanium oxide is preferable as the white coloring agent.

Although the manufacturing method of the particles is not specifically restricted, mixing/grinding method or polymerization method for producing toner of electrophotography is, for example, similarly employable. Further the method of coating resin or charge control agent and so on over the surface of powders such as inorganic or organic pigments is also employable.

Moreover, as the average particle size d(0.5) of the particles to used, it is preferred to set d(0.5) to 0.1-50 μm and to use even particles. If the average particle size d(0.5) exceeds this range, the image clearness sometimes deteriorated, and, if the average particle size is smaller than this range, an agglutination force between the particles becomes larger and the movement of the particles is prevented.

Further, it is preferred that particle size distribution Span of the particles, which is defined by the following formula, is not more than 5 preferably not more than 3:

Span=(d(0.9)−d(0.1))/d(0.5)

(here, d(0.5) means a value of the particle size expressed by μm wherein an amount of the particles having the particle size larger than or smaller than this value is 50%, d(0.1) means a value of the particle size expressed by μm wherein an amount of the particles having the particle size smaller than this value is 10%, and d(0.9) means a value of the particle size expressed by μm wherein an amount of the particles having the particle size smaller than this value is 90%).

If the particle size distribution Span of the particles is set to not more than 5, the particle size becomes even and it is possible to perform an even particle movement.

Furthermore, as a correlation between the particles, it is preferred to set a ratio of d(0.5) of the particles having smallest diameter with respect to d(0.5) of the particles having largest diameter to not more than 50 preferably not more than 10.

Here, the particle diameter distribution and the particle diameter mentioned above can be measured by means of a laser diffraction/scattering method. When a laser light is incident upon the particles to be measured, a light intensity distribution pattern due to a diffraction/scattering light occurs spatially. This light intensity distribution pattern corresponds to the particle diameter, and thus it is possible to measure the particle diameter and the particle diameter distribution.

In the present invention, it is defined that the particle diameter and the particle diameter distribution are obtained by a volume standard distribution. Specifically, the particle diameter and the particle diameter distribution can be measured by means of a measuring apparatus Mastersizer 2000 (Malvern Instruments Ltd.) wherein the particles setting in a nitrogen gas flow are calculated by an installed analysis software (which is based on a volume standard distribution due to Mie's theory).

Here, in order to further improve a repeating durability, it is effective to control a water absorbing rate and a solvent insoluble rate of the resin constituting the particles.

It is preferred that the water absorbing rate of the resin constituting the particles is not more than 3 wt % especially not more than 2 wt %. In this case, a measurement of the water absorbing rate is performed according to ASTM-D570 and a measuring condition is 23° C. for 24 hours.

As for the solvent insoluble rate of the particles, it is preferred that a solvent insoluble rate of the particles, which is defined by the following formula, is not less than 50% more preferably not less than 70%:

solvent insoluble rate (%)=(B/A)×100;

(here, A is a weight of the resin component before being immersed into the solvent and B is a weight of resin components after the liquid powders is immersed into good solvent at 25° C. for 24 hours).

If the solvent insoluble rate is less than 50%, a bleed is generated on a surface of the particle material constituting the particles when maintaining for a long time. In this case, it affects an adhesion power with the particles and prevents a movement of the particles. Therefore, there is a case such that it affects a durability of the image display.

Here, as a solvent (good solvent) for measuring the solvent insoluble rate, it is preferred to use fluoroplastic such as methyl ethyl ketone and so on, polyamide resin such as methanol and so on, acrylic urethane resin such as methyl ethyl ketone, toluene and so on, melamine resin such as acetone, isopropanol and so on, silicone resin such as toluene and so on.

Then, the liquid powders used as the image display media for the displaying in the image display panel will be explained. As a name of the liquid powders utilized in the image display apparatus according to the invention, the applicant has the right of "electric liquid powders (trade mark)".

In the present invention, a term "liquid powders" means an intermediate material having both of liquid properties and particle properties and exhibiting a self-fluidity without utilizing gas force and liquid force. Preferably, it is a material having an excellent fluidity such that there is no repose angle defining a fluidity of powder. For example, a liquid crystal is defined as an intermediate phase between a liquid and a solid, and has a fluidity showing a liquid characteristic and an anisotropy (optical property) showing a solid characteristic (Heibonsha Ltd.: encyclopedia). On the other hand, a definition of the particle is a material having a finite mass if it is vanishingly small and receives an attraction of gravity (Maruzen Co., Ltd.: physics subject-book). Here, even in the particles, there are special states such as gas-solid fluidized body and liquid-solid fluidized body. If a gas is flown from a bottom plate to the particles, an upper force is acted with respect to the particles in response to a gas speed. In this case, the gas-solid fluidized body means a state that is easily fluidized when the upper force is balanced with the gravity. In the same manner, the liquid-solid fluidized body means a state that is fluidized by a liquid. (Heibonsha Ltd.: encyclopedia) In the present invention, it is found that the intermediate material having both of fluid properties and solid properties and exhibiting a self-fluidity without utilizing gas force and liquid force can be produced specifically, and this is defined as the liquid powders.

That is, as is the same as the definition of the liquid crystal (intermediate phase between a liquid and a solid), the liquid powders according to the invention is a material showing the intermediate state having both of liquid properties and particle properties, which is extremely difficult to receive an influence of the gravity showing the particle properties mentioned above and indicates a high fluidity. Such a material can be obtained in an aerosol state i.e. in a dispersion system wherein a solid-like or a liquid-like material is floating in a relatively stable manner as a dispersant in a gas, and thus, in the image display device according to the invention, a solid material is used as a dispersant.

The image display panel which is a target of the present invention has a construction such that the liquid powders composed of a solid material stably floating as a dispersoid in a gas and exhibiting a high fluidity in an aerosol state are sealed between opposed two substrates, wherein one of two substrates is transparent. Such liquid powders can be made to move easily and stably by means of Coulomb's force and so on generated by applying a low voltage.

As mentioned above, the liquid powders means an intermediate material having both of liquid properties and particle properties and exhibiting a self-fluidity without utilizing gas force and liquid force. Such liquid powders become particularly an aerosol state. In the image display device according to the invention, the liquid powders used in a state such that a solid material is relatively and stably floating as a dispersoid in a gas.

As the aerosol state, it is preferred that an apparent volume in a maximum floating state is two times or more than that in none floating state, more preferably 2.5 times or more than that in none floating state, and most preferably three times or more than that in none floating state. In this case, an upper limit is not defined, but it is preferred that an apparent volume is 12 times or smaller than that in none floating state.

If the apparent volume in the maximum floating state is smaller than two times, a display controlling becomes difficult. On the other hand, if the apparent volume in the maximum floating state is larger than 12 times, a handling inconvenience during liquid powders filling operation into the device such as a particle over-scattering occurs. That is, it is measured by filling the liquid powders in a transparent closed vessel through which the liquid powders are seen; vibrating or dropping the vessel itself to obtain a maximum floating state; and measuring an apparent volume at that time from outside of the vessel. Specifically, the liquid powders having a volume 1/5 of the vessel is filled as the liquid powders in a vessel with a polypropylene cap having a diameter (inner diameter) of 6 cm and a height of 10 cm (product name I-boy produced by As-one Co., Ltd.), the vessel is set in the vibrator, and a vibration wherein a distance of 6 cm is repeated at a speed of 3 reciprocating/sec. is performed for 3 hours. Then, the apparent volume in the maximum floating state is obtained from an apparent volume just after a vibration stop.

Moreover, in the image display panel according to the invention, it is preferred that a time change of the apparent volume of the liquid powders satisfies the following formula:

$V_{10}/V_5 > 0.8$;

here, $V_5$ indicates the apparent volume (cm$^3$) of the liquid powders after 5 minutes from the maximum floating state; and $V_{10}$ indicates the apparent volume (cm$^3$) of the liquid powders after 10 minutes from the maximum floating state. In this case, in the image display panel according to the invention, it is preferred to set the time change $V_{10}/V_5$ of the apparent volume of the liquid powders to larger than 0.85, more preferably larger than 0.9, most preferably larger than 0.95. If the time change $V_{10}/V_5$ is not larger than 0.8, the liquid powders are substantially equal to normal particles, and thus it is not possible to maintain a high speed response and durability according to the invention.

Moreover, it is preferred that the average particle diameter d(0.5) of the particle materials constituting the liquid powders is 0.1-20 μm, more preferably 0.5-15 μm, most preferably 0.9-8 μm. If the average particle diameter d(0.5) is less than 0.1 μm, a display controlling becomes difficult. On the other hand, if the average particle diameter d(0.5) is larger than 20 μm, a display is possible, but opacifying power is decreased and thus a thin shape device is difficult. Here, the average particle diameter d(0.5) of the particle materials constituting the liquid powders is equal to d(0.5) in the following particle diameter distribution Span.

It is preferred that particle diameter distribution Span of the particle material constituting the liquid powders, which is defined by the following formula, is not more than 5 preferably not more than 3:

Particle diameter distribution: Span=(d(0.9)−d(0.1))/d(0.5) here, d(0.5) means a value of the particle diameter expressed by μm wherein an amount of the particle material constituting the liquid powders having the particle diameter larger than this value is 50% and an amount of the particle material constituting the liquid powders having the particle diameter expressed by μm wherein an amount of the particle material constituting the liquid powders having a particle diameter smaller than this value is 10%, and d(0.9) means a value of the particle diameter expressed by μm wherein an amount of the particle material constituting the liquid powders having the particle diameter smaller than this value is 90%. If the particle diameter distribution Span of the particle materials constituting the liquid powders is set to not more than 5, the particle diameter becomes even and it is possible to perform an even liquid powders movement.

Here, the particle diameter distribution and the particle diameter mentioned above can be measured by means of a laser diffraction/scattering method. When a laser light is incident upon the particles to be measured, a light intensity distribution pattern due to a diffraction/scattering light occurs spatially. This light intensity distribution pattern corresponds to the particle diameter, and thus it is possible to measure the particle diameter and the particle diameter distribution. In the present invention, it is defined that the particle diameter and the particle diameter distribution are obtained by a volume standard distribution. Specifically, the particle diameter and the particle diameter distribution can be measured by means of a measuring apparatus Mastersizer 2000 (Malvern Instruments Ltd.) wherein the particles setting in a nitrogen gas flow are calculated by an installed analysis software (which is based on a volume standard distribution due to Mie's theory).

The liquid powders may be formed by mixing necessary resin, charge control agent, coloring agent, additive and so on and grinding them, or, by polymerizing from monomer, or, by coating a particle with resin, charge control agent, coloring agent, and additive and so on. Hereinafter, typical examples of resin, charge control agent, coloring agent, additive and so on constituting the liquid powders will be explained.

Typical examples of the resin include urethane resin, acrylic resin, polyester resin, acryl urethane resin, silicone resin, nylon resin, epoxy resin, styrene resin, butyral resin, vinylidene chloride resin, melamine resin, phenolic resin, fluorocarbon polymers, and it is possible to combine two or more resins. For the purpose of controlling the attaching force with the substrate, acryl urethane resin, acryl urethane silicone resin, acryl urethane fluorocarbon polymers, urethane resin, fluorocarbon polymers are preferred.

Examples of the electric charge control agent include, positive charge control agent including the fourth grade ammonium salt compound, nigrosine dye, triphenylmethane compound, imidazole derivatives, and so on, and negative charge control agent such as metal containing azo dye, salicylic acid metal complex, nitroimidazole derivative and so on.

As for a coloring agent, various kinds of organic or inorganic pigments or dye are employable. For example, use is made of Nigrosine, Methylene Blue, quinoline yellow, rose Bengal and so on.

Examples of inorganic additives include titanium oxide, zinc white, zinc sulphide, antimony oxide, calcium carbonate, pearl white, talc, silica, calcium silicate, alumina white, cadmium yellow, cadmium red, titanium yellow, Prussian blue, Armenian blue, cobalt blue, cobalt green, cobalt violet, ion oxide, carbon black, manganese ferrite black, cobalt ferrite black, copper powder, aluminum powder.

However, if the above materials are only mixed or coated with no contrivance, the liquid powders exhibiting an aerosol state cannot be obtained. The regular method of forming the liquid powders exhibiting an aerosol state is not defined, but the following method is preferably used.

At first, inorganic fine particles having an average particle size of 20-100 nm preferably 20-80 nm are preferably fixed on a surface of materials constituting the liquid powders. Moreover, it is preferred that the inorganic fine particles are made of tow or more groups of fine particles. Further, it is preferred to treat the inorganic fine particles by silicone oil. Here, as for the inorganic fine particles, use may be made of silicon dioxide (silica), zinc oxide, aluminum oxide, magnesium oxide, cerium oxide, ferric oxide, copper oxide and so on. In this case, a method of fixing the inorganic fine particles is important. For example, use may be made of hybridizer (NARA Machinery Industry Co., Ltd.) or mechano-fusion (Hosokawa Micron Co., Ltd.), and the liquid powders showing an aerosol state are formed under a predetermined condition (for example processing time).

Here, in order to further improve a repeating durability, it is effective to control a stability of the resin constituting the liquid powders, especially, a water absorbing rate and a solvent insoluble rate. It is preferred that the water absorbing rate of the resin constituting the liquid powders sealed between the substrates is not more than 3 wt % especially not more than 2 wt %. In this case, a measurement of the water absorbing rate is performed according to ASTM-D570 and a measuring condition is 23° C. for 24 hours. As for the solvent insoluble rate of the liquid powders, it is preferred that a solvent insoluble rate of the liquid powders, which is defined by the following formula, is not less than 50% more preferably not less than 70%:

solvent insoluble rate (%)=$(B/A) \times 100$;

(here, A is a weight of the liquid powders before being immersed into the solvent and B is a weight of resin components after the liquid powders are immersed into good solvent at 25° C. for 24 hours).

If the solvent insoluble rate is less than 50%, a bleed is generated on a surface of the particle materials constituting the liquid powders when maintaining for a long time. In this case, it affects an adhesion power with the liquid powders and prevents a movement of the liquid powders. Therefore, there is a case such that it affects a durability of the image display. Here, as a solvent (good solvent) for measuring the solvent insoluble rate, it is preferred to use fluoroplastic such as methyl ethyl ketone and so on, polyamide resin such as methanol and so on, acrylic urethane resin such as methyl ethyl ketone, toluene and so on, melamine resin such as acetone, isopropanol and so on, silicone resin such as toluene and so on.

The particles and the liquid powders used as the image display media according to the invention have charge characteristics. Because it is necessary for the particles or the liquid powders to hold the charged electric charge, the particles or the liquid powders with the volume specific resistance of $1 \times 10^{10}$ Ω·cm or greater are preferable, and the particles or the liquid powders with slow charge attenuation property evaluated by the measuring method below are more preferable.

That is, the particles are made into a film having a thickness of 5-100 μm by means of a press method, a heating/melting method, a casting method and so on, and the voltage of 8 kV is applied to a Corona generator disposed with a distance of 1 mm to the film surface so as to generate Corona discharge, which charges the film surface. Then, the change of the surface potential is measured to determine the suitability. In this occasion, it is preferable to select the material whose maximum surface potential will be greater than 300 V after 0.3 seconds, more preferable to select the material whose maximum surface potential will be greater than 400 V after 0.3 second as the material for composing the particles.

Figure 16:
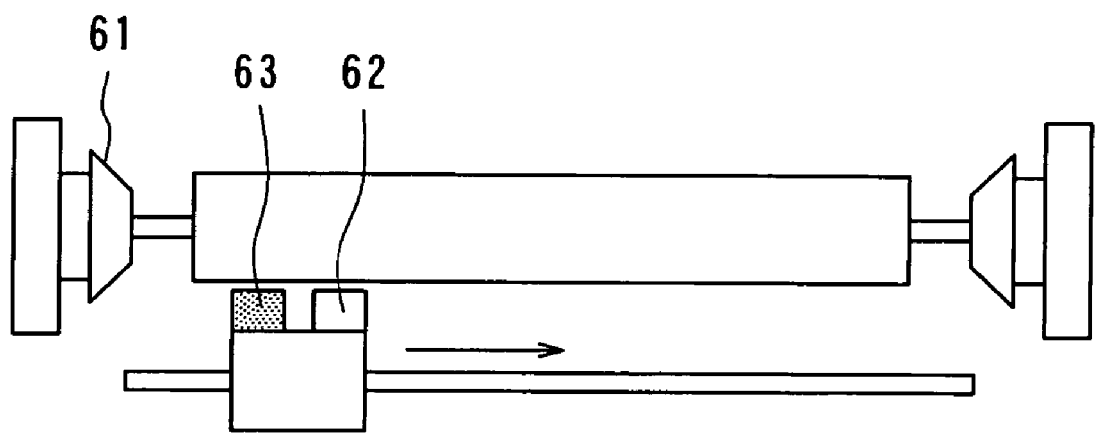
FIG. 16 is a schematic view explaining a measurement apparatus for measuring a surface potential of the particles according to the invention.

Additionally, the foregoing surface potential is measured by means of an instrument (CRT2000 produced by QEA Inc.) as shown in FIG. 16. In this instrument both end portions of a roll shaft being held with chuck 61, compact scorotron discharger 62 and surface potential meter 63 are spaced with predetermined interval to form a measurement unit. Facedly deploying the measurement unit with a distance of 1 mm from the surface of the particles, and by moving the measurement unit from one end portion of the roll shaft to the other end portion with an uniform speed, with the state that the roll shaft remains stopping and while giving surface charge, a method of measuring its surface potential is preferably adopted. Moreover, measurement environment should be settled at the temperature of 25±3° C. and the humidity of 55±5% RH.

A charge amount of the particles is properly depend upon the measuring condition. However, it is understood that the charge amount of the particles used for the image display media in the image display panel is substantially depend upon an initial charge amount, a contact with respect to the partition wall, a contact with respect to the substrate, a charge decay due to an elapsed time, and specifically a saturation value of the particles during a charge behavior is a main factor.

After various investigations of the inventors, it is fond that an adequate range of the charged values of the particles used for the image display media can be estimated by performing a blow-off method utilizing the same carrier particles so as to measure the charge amount of the image display media.

The measuring method will be explained later in detail. By performing the blow-off method, it is possible to contact the particles and the carrier particles sufficiently and to measure the charge amount per unit weight of respective particles by measuring its saturated charge amount. Then, it is possible to calculate the surface charge density of respective particles by obtaining a particle diameter and a specific gravity of respective particles separately.

In the image display device, since a particle diameter of the particles constituting the powders or the liquid powders used as the image display media (hereinafter, referred as particles) is small and an affection of gravity is too small to neglect its affection, the specific gravity is not affected to the movement of the particles. However, on the charge amount of the particles, if the particles have a same particle diameter and a same average charge amount per unit weight, the maintained charge amounts are different by two times in the case that the specific gravities of the particles are different by two times. Therefore, it is understood that it is preferred to estimate the charge characteristics of the particles used in the image display device by the surface charge density (unit: $\mu C/m^2$) which is irrelevant to the specific gravity of the particles.

In the image display panel utilizing two groups of the particles or two groups of liquid powders as the image display media, if a range of the surface charge density and a difference on the surface charge density in the particles or the liquid powders are maintained in a suitable range, two groups of the particles or the two groups of the liquid powders have a sufficient charge amount by contacting with each other, and maintains a moving function by an electrostatic field.

Here, in order to make charge characteristics of the two groups of the particles or the two groups of the liquid powders, which are existent near with each other in the image display panel, sufficient, it is necessary to obtain some degree of difference on the surface charge density so as to differentiate the moving directions of the two particles, but it is not always necessary to make the difference on the surface charge density larger. In the image display device utilizing the particle movement, when a particle diameter of the particles is large, the main factor for determining a fly/move electrostatic field (voltage) of the particles is an electric imaging force. Therefore, in order to move the particles by a low electrostatic field (voltage), it is preferred to make the charge amount low. Moreover, when a particle diameter of the particles is small, the main factor for determining the fly/move electrostatic field (voltage) is a non-electric force such as an intermolecular force, a liquid cross-linking force and so on. Therefore, in order to move the particles by a low electrostatic field (voltage), it is preferred to make the charge amount high. However, since theses phenomena are largely depend on surface properties (material, shape) of the particles, it is not possible to define only by the particle diameter and the charge amount.

The inventors find that, in the image display panel utilizing the particles having an average particle diameter of 0.1-50 μm or the liquid powders having an average particles of 0.1-30 μm in the particle substances constituting the liquid powders, when the absolute value of the difference between the surface charge densities of two groups of particles or two groups of liquid powders, which are measured by the blow-off method using the same kind of particles, is 10-150 μC/m$^2$, it is possible to obtain the particles usable for the image display device in the case of 20-150 μC/m$^2$ on the absolute value of the difference between the surface charge densities.

In the image display panel according to the invention, an interval between the substrates is not restricted if the image display media can be moved and a contrast can be maintained, and it is adjusted normally to 10-500 μm, preferably 10-200 μm.

Moreover, it is preferred to control a volume occupied rate of the image display media (particles or liquid powders) in a space between the opposed substrates to 3-70 vol %, more preferably 5-60 vol %. If the volume occupied rate of the image display media exceeds 70 vol %, the image display media (particles or liquid powders) become difficult to move, and if it is less than 5 vol %, a sufficient contrast cannot be obtained and a clear image display is not performed.

Further, in the present invention, it is important to control a gas in a gap surrounding the particles or the liquid powders as the image display media between the substrates, and a suitable gas control contributes an improvement of display stability. Specifically, it is important to control a humidity of the gap gas to not more than 60% RH at 25° C., preferably not more than 50% RH, more preferably not more than 35% RH.

Figure 8:
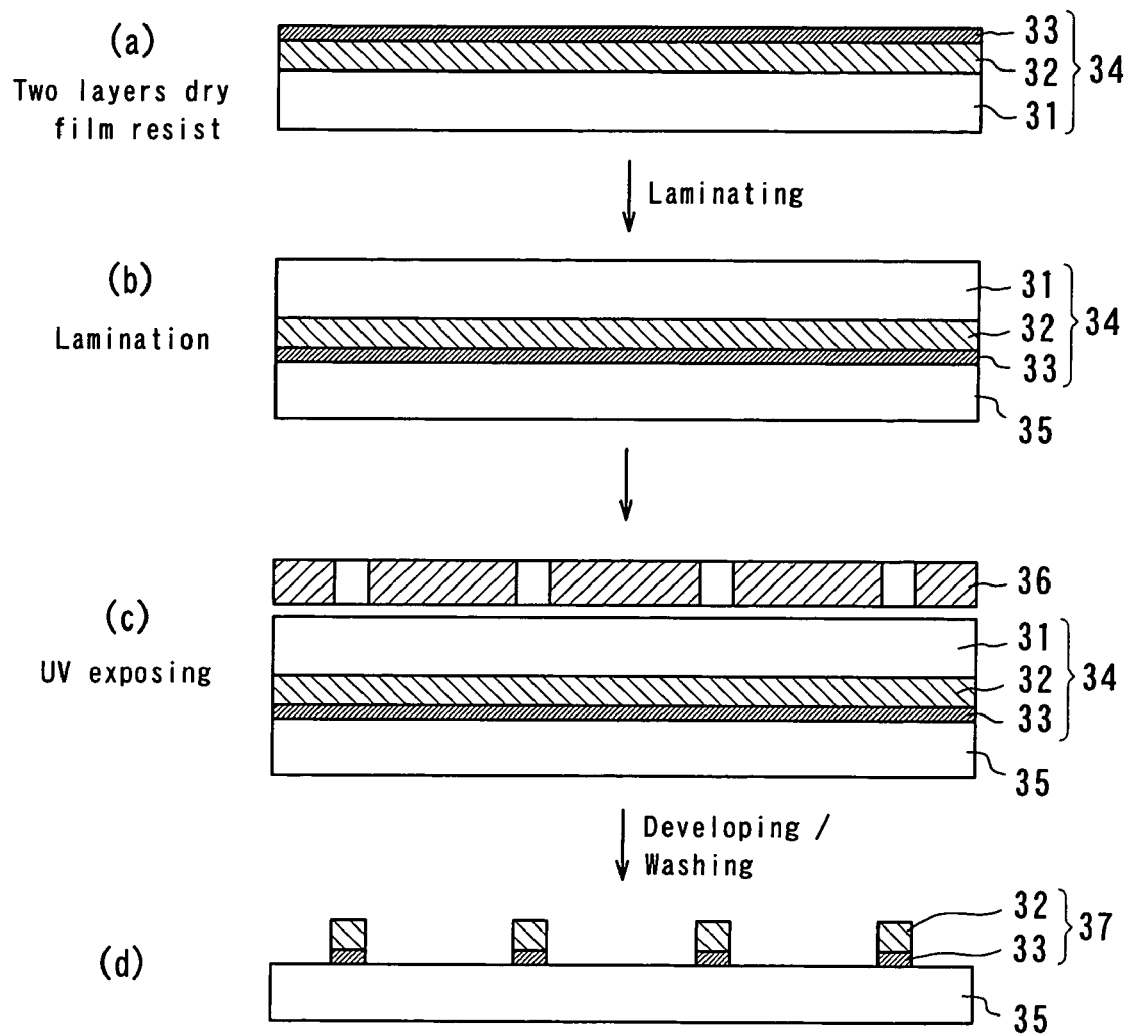
FIG. 8a-8d are schematic views respectively explaining respective steps of another embodiment of a method of manufacturing an image display panel according to the second invention.

The above gap means a gas portion surrounding the image display media (particles or liquid powders) obtained by substituting the electrodes 25, 26, an occupied portion of the image display media (particles or liquid powders) 23, an occupied portion of the partition walls 24 and a seal portion of the device from the space between the substrate 21 and the substrate 22 for example in FIG. 8.

A kind of the gap gas is not limited if it has the humidity mentioned above, but it is preferred to use dry air, dry nitrogen gas, dry helium gas, dry carbon dioxide gas, dry methane gas and so on.

In the image display panel used in the image display device according to the invention, plural of the foregoing display elements are disposed in a matrix form, and images can be displayed. In the case of displaying arbitral color other than black and white, a color combination of the image display media (particles or the liquid powders) is suitably selected. In the case of monochrome display, one display element makes one pixel. In the case of full color display, three kinds of display elements, i.e., one group of display elements each having color plate of R (red), G (green) and B (blue) respectively and each having particles of black composes a set of disposed elements preferably resulting in the reversible image display panel having the sets of the elements.

Hereinafter, examples and comparative examples of first invention—the second invention will be shown respectively, and the present invention will be explained in further detail.

Examples of the First Invention

As to a First Example of the First Invention

Actually, as shown in below, image display panels according to an example 1 and a comparative example 1 both utilizing ITO glass substrate and image display panels according to an example 2 and an example 3 both utilizing ITO resin (PET) substrate were manufactured, and the examples 1-3 and the comparative example 1 were compared. In the examples 1-3 and the comparative example 1, constructions other than members shown in the following Table 1 were entirely same.

Example 1

Glass Substrate

Figure 17:
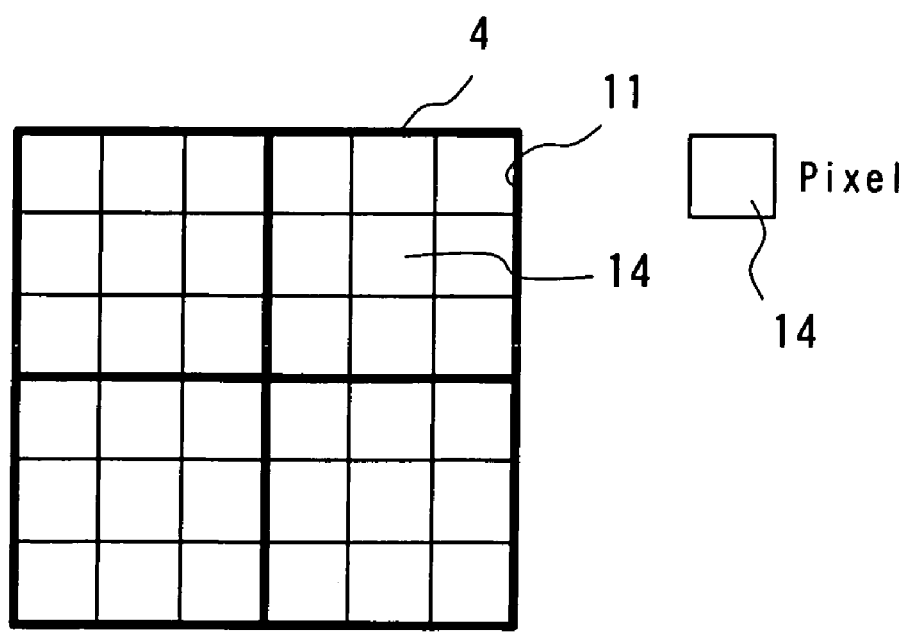
FIG. 17 is a schematic view depicting a part of the image display panel according to example 1 of the first invention.

As shown in the following Table 1, an image display panel shown in FIG. 17 partly, in which the cells 11 do not correspond one for one to the pixels 14 in such a manner that a size of the partition walls (corresponding to a size of the cells) is 150 μm with respect to a size of the pixels of 50 μm (here, cell:pixel=1:9), was manufactured. In this example, as shown in Table 1, a rib shape (corresponding to a shape of the partition walls) was a grid structure (square shape), and a rib width (corresponding to a width of the partition walls) was 20 μm, so that an opening rate of the thus manufactured image display panel was 75%.

Example 2

Resin (PET) Substrate

Figure 18:
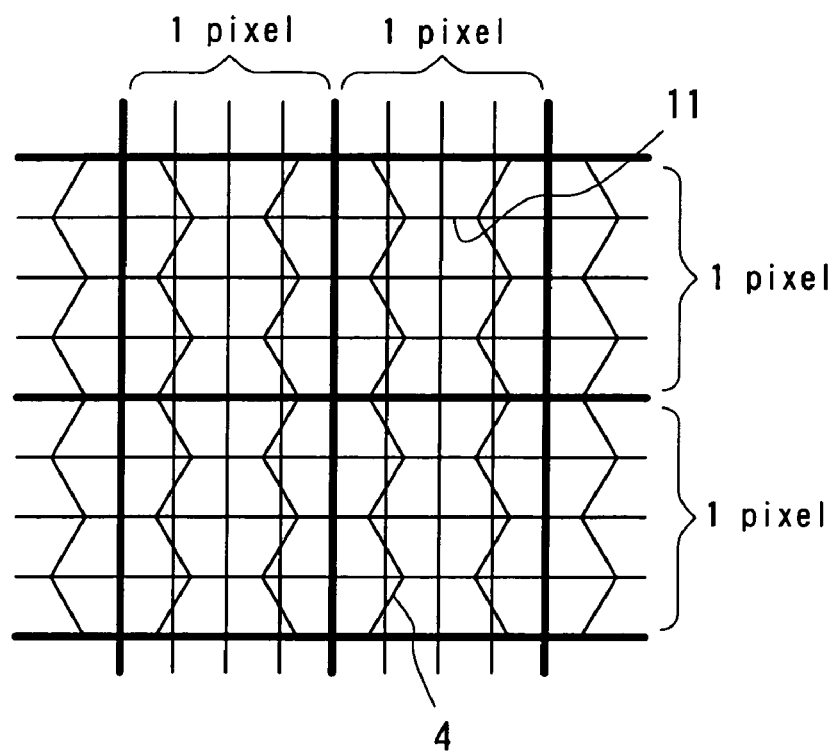
FIG. 18 is a schematic view showing a part of the image display panel according to example 2 of the first invention.

As shown in the following Table 1, an image display panel shown in FIG. 18 partly, in which the cells 11 do not correspond one for one to the pixels 14 in such a manner that a size of the partition walls (corresponding to a size of the cells) is 150 μm with respect to a size of the pixels of 300 μm (here, cell:pixel=4:1), was manufactured. In this example, as shown in Table 2, a rib shape (corresponding to a shape of the partition walls) was a honeycomb structure (hexagonal shape), and a rib width (corresponding to a width of the partition walls) was 10 μm, so that an opening rate of the thus manufactured image display panel was 86%.

Example 3

Resin (PET) Substrate

Figure 19:
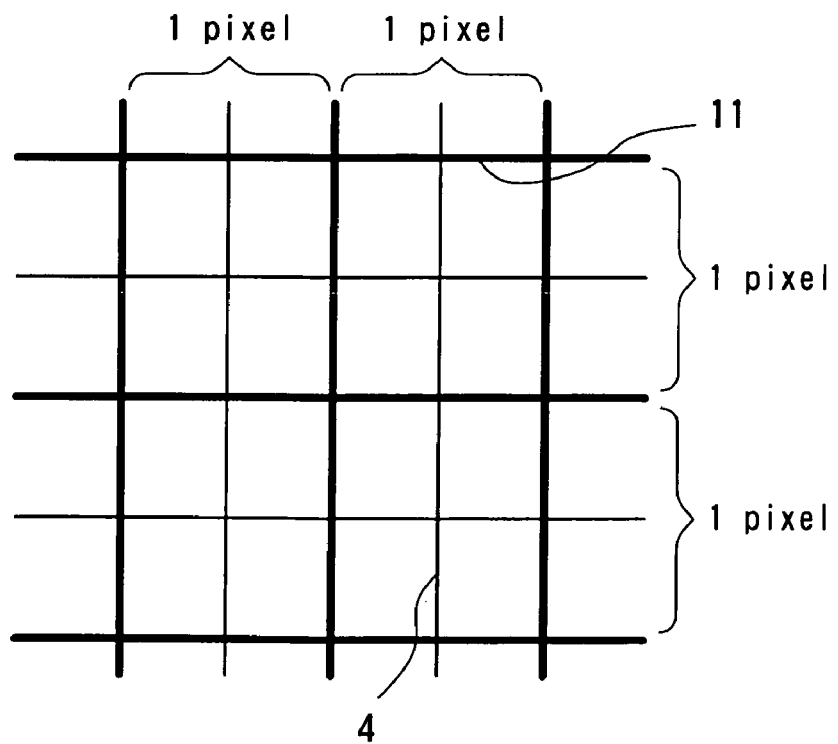
FIG. 19 is a schematic view illustrating a part of the image display panel according to example 3 of the first invention.

As shown in the following Table 1, an image display panel shown in FIG. 19 partly, in which the cells 11 do not correspond one for one to the pixels 14 in such a manner that a size of the partition walls (corresponding to a size of the cells) is 150 μm with respect to a size of the pixels of 50 μm (here, cell:pixel=4:1), was manufactured. In this example, as shown in Table 1, a rib shape (corresponding to a shape of the partition walls) was a grid structure (square shape), and a rib width (corresponding to a width of the partition walls) was 20 μm, so that an opening rate of the thus manufactured image display panel was 87%.

Comparative Example 1

Glass Substrate

Figure 20:
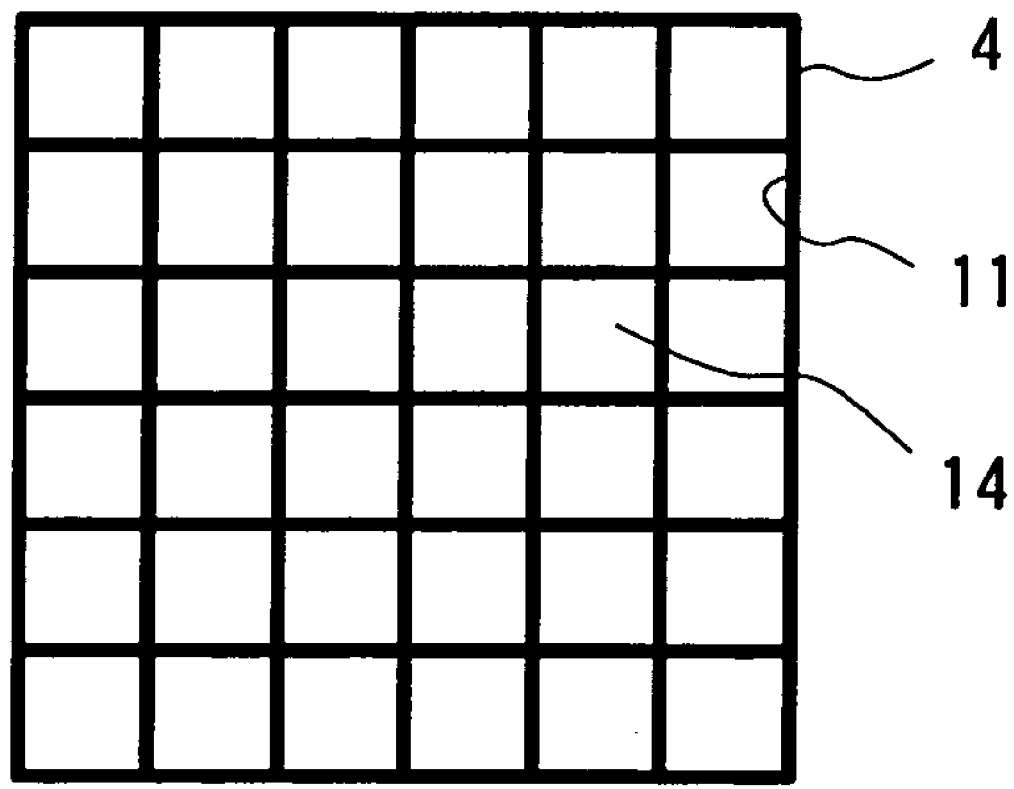
FIG. 20 is a schematic view depicting a part of the image display panel according to comparative example 1 of the first invention.

As shown in the following Table 1, an image display panel shown in FIG. 20 partly, in which the cells 11 correspond one for one to the pixels 14 in such a manner that a size of the partition walls (corresponding to a size of the cells) is 50 μm with respect to a size of the pixels of 50 μm, was manufactured. In this example, as shown in Table 1, a rib shape (corresponding to a shape of the partition walls) was a grid structure (square shape), and a rib width (corresponding to a width of the partition walls) was 20 μm, so that an opening rate of the thus manufactured image display panel was 36%.

TABLE 1

|  | Example 1 | Example 2 | Example 3 | Comparative Example 1 |
|---|---|---|---|---|
| Pixel size | 50 μm | 300 μm | 300 μm | 50 μm |
| Partition wall size | 150 μm | 150 μm | 150 μm | 50 μm |
| Rib shape | square | hexagon | square | square |
| Cell arrangement | grid | honeycomb | grid | grid |
| Rib width | 20 μm | 10 μm | 10 μm | 20 μm |
| Opening rate | 75% | 86% | 87% | 36% |
| Used substrate | glass | PET | PET | glass |

<Comparative Results>

In the image display panels of the examples 1-3 and the comparative example 1, an image was displayed respectively under the same conditions. As a result, the following results about image properties were understood.

(1) When the examples 1-3 and the comparative example 1 were compared, it was found that, in the comparative example 1, since a ration of a partition wall surface occupied on a display surface is larger and an opening rate becomes extraordinarily small, an image display property becomes worse as compared with the examples 1-3 having a higher opening rate.

(2) When the example 1 utilizing the glass substrate and the example 3 utilizing the resin (PET) substrate were compared, it was found that, in the example 3 in which the resin substrate is used and the partition walls have a grid structure with a square shape, since the substrate is elongated by a heating treatment, and the partition walls and the pixels are interfered by a frequent displacement between the partition walls and the pixels, there is a case such that a display deterioration due to a moire is generated.

(3) When the example 2 and the example 3 both utilizing the resin (PET) substrate were compared, it was found that, in both examples, the substrate is elongated by a heating treatment, but, in the example 2 in which the partition walls are arranged randomly in such a manner that the partition walls have a honeycomb structure with a hexagonal shape, a moire due to an interference between the particle walls and the pixels can be inhibited. As a result, it was found that, in the case of utilizing the resin substrate, the partition walls are arranged randomly in such a manner that they have a honeycomb structure with a hexagonal shape.

As to a Second Example of the First Invention

Figure 21:
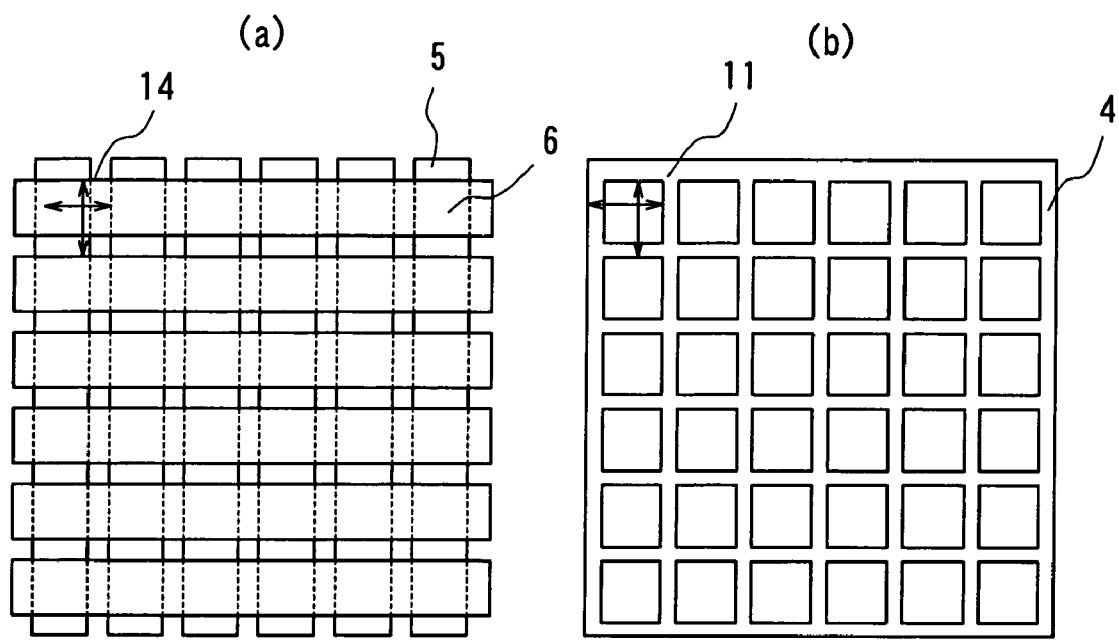
FIGS. 21a and 21b are schematic views respectively explaining an area of pixel and an area of cell in the image display device according to the third invention.
Figure 22:
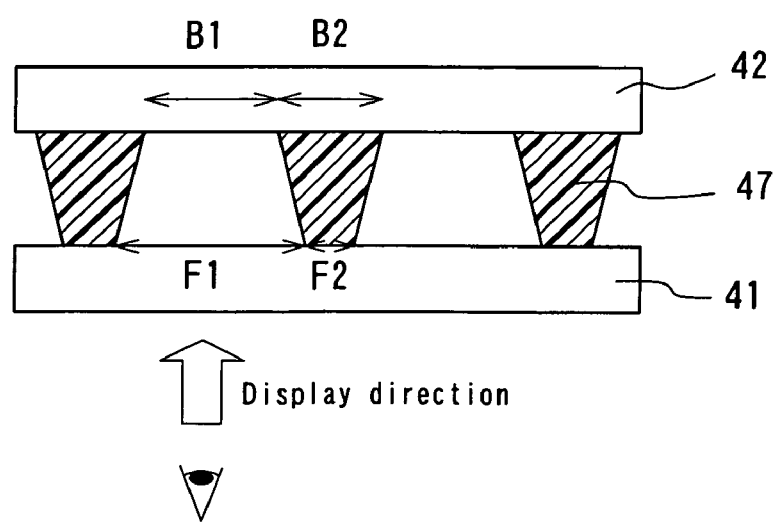
FIG. 22 is a schematic view explaining a shape of the partition wall in the examples of the third invention.

By varying an area of the cell 11 and an area of the pixel 14 constructed by one cell 11, image display panels according to examples 11-13 in which a ratio of cell area/pixel area is not larger than 4 within the scope of the invention, and image display panels according to comparative examples 11, 12 in which a ratio of cell area pixel area/pixel area is larger than 4 without the scope of the invention, were manufactured under the same conditions other than the cell area and the pixel area. Here, as shown in FIG. 21a, an area of one pixel 14 was assumed to be an area which is obtained by multiplying lengths of a longitudinal arrow and a lateral arrow in a portion wherein the electrode 5 and the electrode 6 are overlapped. In addition, as shown in FIG. 21b, an area of one cell 11 was assumed to be an area which is obtained by multiplying lengths of a longitudinal arrow and a lateral arrow in a portion formed by the partition walls 4. Then, with respect to respective image display panels, a display quality and a character visibility were detected. The detected results were shown in the following Table 2. In Table 2, a symbol ○ showed a good example and a symbol X showed a no-good example, respectively.

TABLE 2

|  | Pixel area (μm$^2$) | Rib (cell) area (μm$^2$) | Ratio | Display quality | Character visibility |
|---|---|---|---|---|---|
| Example 21 | 30625 | 30625 | 1.00 | ○ | ○ |
| Example 22 | 30625 | 22500 | 0.73 | ○ | ○ |
| Example 23 | 30625 | 40000 | 1.31 | ○ | ○ |
| Comparative Example 21 | 30625 | 129600 | 4.23 | X | X: difficult to read |
| Comparative Example 22 | 30625 | 275625 | 9.00 | X | X: out of recognition |

From the results shown in Table 2, the examples 11-13 in which a ratio of cell area/pixel area is not larger than 4 have a good image quality and an excellent character visibility as compared with the comparative example 11, 12 in which a ratio of cell area/pixel area is larger than 4.

Examples of the Second Invention

According to FIGS. 7a-7d, the color partition walls 25 were manufactured. At first, a black liquid resist (product of Nippon Chemical Group:NSBK1000) was dropped on the substrate 21, and a film was formed by spin-coater under the condition of 1500 rpm×30 minutes, so that the thin film 22 (first layer) having a black color and a thickness of 1 μm was formed on the substrate 21. Then, the substrate 21, on which the thin film 22 was formed, was subjected to a pre-cure (aiming at improving a solvent drying property and a substrate contact property) under the condition of 100° C.×2 minutes in a clean oven of a hot-air circulation type. Then, a dry film resist (product of Nichigo-Morton: ALPHO NIT2) was laminated on the thin film 22 at 100° C., so that the thick layer 23 (second layer) was formed on the thin layer 22.

After that, an exposure was performed by using a parallel light exposing apparatus in such a manner that a light is irradiated on the thick layer 23 and the thin layer 22 through the mask 24. Then, a developing was performed by using a sodium carbonate solution (concentration: 1%), and then a washing was performed by using a purified water. The thus obtained sample was subjected to a post-bake (aiming at reaction finish) under the condition of 200° C.×1 hour, so that the target color partition walls 25 were obtained. The thus obtained color partition walls 25 showed no developing defects and were the partition walls having correct patterns.

Examples of the Third Invention

With respect to the thus obtained examples and comparative examples, estimations were performed according to the following standard. As a shape of the partition walls, lengths B1, B2, F1 and F2 were measured by naked eyes. The opening rates at the rear surface and the front surface were obtained by calculating the thus measured B1, B2, F1 and F2. Then, as a condition for the photo-lithography method, an amount of exposure was actually measured by using an exposure integrating indicator. The proximity indicating a distance between the photo mask and the photo resist film was measured by naked eyes by means of an optical microscope. As to a maximum reflection coefficient, OD value (optical concentration) was measured by using Macbeth densitometer D19C, and the maximum reflection coefficient was assumed to be a maximum value among the values converted into a reflection coefficient. The contrast ratio was calculated by a ration of maximum/minimum reflection coefficients.

Example 21

The partition walls having a height of 250 μm were formed on the glass substrate with the ITO electrode having a thickness of about 500 Å so as to form the partition walls having a stripe shape and a cantilever structure.

The partition walls were formed as follows. At first, a photo resist film having a thickness of 150 μm was adhered to a substrate. Then, an exposure was performed under the conditions shown in the following Table 3 by using a photo mask so as to harden the portions corresponding to the partition walls. After that, non-hardened portions of the photo resist film were developed under the developing conditions shown in the following Table 3 and were washed under the washing conditions shown in the following Table 3 so as to remove the non-hardened portions, so that the partition walls having a reverse taper shape were manufactured.

Moreover, particles A and particles B were prepared. The particles A were produced in such a manner that thermoplastic polyether ester elastomer: HYTREL 6377 (product of DU PONT-TORAY CO., LTD.), CB 4 phr, charge control agent: BontronN07 (product of Orient Chemical Industries Ltd.) 2 phr were added, mixed -ground and classified by a jet-mill. The particles B were produced in such a manner that thermoplastic polyether ester elastomer: HYTREL 6377 (product of DU PONT-TORAY CO., LTD.), titanium oxide 10 phr, charge control agent: BontronE89 (product of Orient Chemical Industries Ltd.) 2 phr were added, mixed ground and classified by a jet-mill.

The particles A, B mentioned above were arranged between the glass substrate with the ITO electrode on which the partition walls mentioned above were formed and the glass substrate with the ITO electrode on which no partition walls were formed, and peripheral portions of the glass substrates were connected by using an epoxy adhesive so as to seal these particles, so that the image display device was manufactured. Mixing rate between the particles A and the particles B was made even, and an adjustment was performed in such a manner that a filling rate of these particles between the glass substrates was 60 vol. %. Here, as an atmosphere filling the space, use was made of an air having a relative humidity of 50% RH.

Estimation results with respect to the image display device according to the thus manufactured example 21 are shown in the following Table 3.

Example 22

The image display device was manufactured as is the same manner as that of the example 21 except that the proximity is made narrow normally and an amount of exposure is low as shown in the following Table 3. Estimation results with respect to the image display device according to the example 2 are shown in the following Table 3.

Comparative Example 21

The image display device was manufactured as is the same manner as that of the example 21except that a shape of the partition walls has a cross section whose width is not changed and the proximity is made narrow normally as shown in the following Table 3. Estimation results with respect to the image display device according to the comparative example 21 are shown in the following Table 3.

TABLE 3

|  | Example 21 | Example 22 | Comparative Example 21 |
|---|---|---|---|
| B1 (μm) | 300 | 300 | 300 |
| B2 (μm) | 50 | 50 | 50 |
| F1 (μm) | 342 | 340 | 300 |
| F2 (μm) | 8 | 10 | 50 |
| Rear surface opening rate (%) | 73 | 73 | 73 |
| Front surface opening rate (%) | 95 | 94 | 73 |
| Manufacturing method |  |  |  |
| Light |  | parallel light |  |
| Exposure amount (mJ/cm$^2$) | 400 | 100 | 400 |
| Proximity (mm) | 0.5 | 0.1 | 0.1 |
| Developer |  | solution including 1% sodium carbonate |  |
| Exposure time (sec.) | 60 | 30 | 60 |
| Washing liquid |  | purified water |  |
| Washing time (sec.) | 120 | 90 | 120 |
| Maximum reflectance (%) | 48 | 47 | 37 |
| Contrast ratio | 12 | 12 | 9 |

From the results shown in Table 3, it was understood that the image display device according to the example 21 in which a light is intentionally diffused by means of a proximity exposure wherein the gap is arranged between the photo mask and the photo resist film and a reverse taper shape is applied to the partition walls, and, the image display device according to the example 22 in which a hardening agent is reacted only at a surface layer by a low exposure light amount and a reverse taper shape is applied to the partition walls, have a high maximum reflection coefficient and a high contrast ratio as compared with the image display device according to comparative example 21 in which the partition walls having no taper shape were manufactured by means of the normal photolithography method. Moreover, it was understood that the example 21 and the example 23 have a high opening rate on a display surface as compared with the comparative example 21.

INDUSTRIAL APPLICABILITY

The image display device according to the invention is applicable to the image display unit for mobile equipment such as notebook personal computers, PDAs, cellular phones and so on; to the electric paper for electric book, electric newspaper and so on; to the bulletin boards such as signboards, posters, blackboards and so on; to the image display unit for electric calculator, home electric application products, auto supplies and so on; to the card display unit for point card, IC card and so on; and to the display unit for electric POP, electric advertisement, electric price tag, electric musical score, RF-ID device and so on.

The invention claimed is:

1. An image display device which comprises an image display panel, in which image display media are sealed in cells formed in an isolated manner from one another by partition walls between the opposed substrates, at least one of two substrates being transparent, and, in which the image display media, to which an electrostatic field is applied, are made to move so as to display an image, wherein a plurality of cells are arranged such that they do not correspond one for one to the positions of pixels for displaying the image.

2. An image display device which comprises an image display panel, in which image display media are sealed in cells formed in an isolated manner from one another by partition walls between the opposed substrates, at least one of two substrates being transparent, and, in which the image display media, to which an electrostatic field is applied, are made to move so as to display an image, wherein a ratio of cell area/pixel area is formed to be smaller than 4.

3. The image display device according to claim 1, wherein a shape of the cell formed by the partition walls is a square shape, a triangular shape, a hexagonal shape, a circular shape or an oval shape.

4. The image display device according to claim 1, wherein an arrangement of the cell is a honeycomb structure.

5. The image display device according to claim 1, wherein a shape of the cell formed by the partition walls is a hexagonal shape and an arrangement of the cell is a honeycomb structure.

6. The image display device according to claim 1, wherein the image display media are particles or liquid powders.

7. A method of manufacturing an image display panel comprising image display media such as gas, liquid, solid, particles, liquid powders and so on sealed in cells formed in an isolated manner from one another by partition walls between two opposed substrates, at least one of two substrates being transparent, the method comprising:
    forming a first layer made of photosensitive color composite on one substrate;
    forming a second layer made of photosensitive composite, which has a light transmission higher than that of the first layer and a thickness larger than that of the first layer, on the first layer;
    performing an exposure through a mask with respect to the first layer and the second layer on the substrate;
    performing a developing and a washing with respect to the exposed first and second layers so as to form color partition walls on the substrate; and
    connecting the other substrate to the color partition walls.

8. The method of manufacturing the image display panel according to claim 7, wherein a light transmission of the photosensitive color composite forming the first layer in a wavelength band of visible light (380 nm-780 nm) is not larger than 20%, and a light transmission of the photosensitive composite forming the second layer in a wavelength band of 300 nm-450 nm is not less than 20%.

9. The method of manufacturing the image display panel according to claim 7, wherein a film made of a photosensitive composite is laminated on the first layer so as to obtain the second layer.

10. The method of manufacturing the image display panel according to claim 7, wherein a color of the first layer is black.

11. An image display panel manufactured according to the method of manufacturing the image display panel set forth in claim 7.

12. An image display panel manufactured according to the method of manufacturing the image display panel set forth in claim 7, wherein the image display panel uses particles or liquid powders as the image display media.

13. An image display device which comprises an image display panel, in which particles or liquid powders as image display media are sealed in cells formed in an isolated manner from one another by partition walls between two opposed substrates, at least one of two substrates being transparent, and, in which the particles or the liquid powders, to which an electrostatic field is applied, are made to move so as to display an image, wherein the partition walls are manufactured by a photolithography method, and a shape of the partition wall is a taper shape such that a width of an end portion at a side of a rear substrate is larger than that at a side of a front substrate.

14. The image display device according to claim 13, wherein the partition walls are manufactured by means of the photolithography method by:
    applying a photosensitive material including a thermosetting resin on the substrate;
    performing an exposure only for a portion of the applied photosensitive material corresponding to the partition walls by using a photo mask;
    hardening the photosensitive material; and removing non-hardening portions by developing;
so that the partition walls having a reverse taper shape, such that the width of the end portion at a side of the rear substrate is larger than that at a side of the front substrate, are formed.

15. The image display device according to claim 14, wherein, in manufacturing the partition wall having the reverse taper shape, a light is intentionally diffused by performing a proximity exposure, in which a gap is formed between the photo mask and the photosensitive material, so that the reverse taper shape is formed.

16. The image display device according to claim 14, wherein, in manufacturing the partition wall having the reverse taper shape, an exposure is performed at a low amount of light exposure so as to react only a surface layer of the hardening agent, so that the reverse taper shape is formed.

17. The image display device according to claim 13, wherein a ratio w1/w2 between an end width w2 at a side of the rear substrate and an end width w1 at a side of the front substrate is not larger than 0.5.

18. The image display device according to claim 13, wherein a color of the particles or the liquid powders used for the image display media is white or black.

19. The image display according to claim 13, wherein the partition wall positioned between the opposed substrates has a cantilever rib structure.

20. The image display device according to claim 13, wherein a particle size distribution Span of inorganic powders included in the partition wall material, which is defined by the following formula, is less than 8:

$$\text{Span} = (d(0.9) - d(0.1))/d(0.5);$$

wherein, $d(0.5)$ a value of the particle size expressed by μm wherein an amount of the particles having the particle size larger than or smaller than this value is 50%, $d(0.1)$ is a value of the particle size expressed by μm wherein an amount of the particles having the particle size smaller than this value is 10%, and $d(0.9)$ is a value of the particle size expressed by μm wherein an amount of the particles having the particle size smaller than this value is 90%.

21. The image display device according to claim 13, wherein an average particle diameter of the inorganic powders is 0.1-20 μm.

22. The image display device according to claim 13, wherein a gap between the opposed substrates is filled with a gas having a relative humidity of not larger than 60% RH at 25°.

* * * * *